(12) United States Patent
Narasimhan et al.

(10) Patent No.: US 11,492,039 B2
(45) Date of Patent: *Nov. 8, 2022

(54) STEER-BY-WIRE SYSTEMS AND METHODS OF OPERATING THEREOF IN VEHICLES

(71) Applicant: Canoo Technologies Inc., Torrance, CA (US)

(72) Inventors: Ganesh Narasimhan, Irvine, CA (US); Paolo E. Pucci, Redondo Beach, CA (US)

(73) Assignee: Canoo Technologies Inc., Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/650,614

(22) Filed: Feb. 10, 2022

(65) Prior Publication Data

US 2022/0289279 A1    Sep. 15, 2022

Related U.S. Application Data

(63) Continuation of application No. 17/336,513, filed on Jun. 2, 2021, which is a continuation of application
(Continued)

(51) Int. Cl.
   *B62D 6/00*   (2006.01)
   *B62D 5/04*   (2006.01)
   (Continued)

(52) U.S. Cl.
   CPC ........... *B62D 5/0484* (2013.01); *B62D 3/126* (2013.01); *B62D 5/006* (2013.01); *B62D 6/008* (2013.01)

(58) Field of Classification Search
   CPC ...... B62D 5/0484; B62D 3/126; B62D 5/006; B62D 6/008; B62D 6/00
   (Continued)

(56) References Cited

U.S. PATENT DOCUMENTS

| 2,168,201 A | 8/1939 | Gilbert |
| 4,862,366 A | 8/1989 | Morishita et al. |

(Continued)

FOREIGN PATENT DOCUMENTS

| CA | 2653798 A1 | 8/2009 |
| CN | 1326736 C | 7/2007 |

(Continued)

OTHER PUBLICATIONS

U.S. Appl. No. 17/200,033, Examiner Interview Summary dated May 24, 2021, 1 pg.
(Continued)

*Primary Examiner* — Shardul D Patel

(57) ABSTRACT

Described herein are steer-by-wire systems and methods of operating these systems in vehicles. A steer-by-wire system comprises a steering wheel assembly, comprising a steering wheel, sensors, and a torque generator. The system comprises a rack assembly, comprising a steering rack, sensors, and a rack actuator. The steering wheel assembly and the rack assembly are communicatively coupled by a steer-by-wire system controller, without having any direct mechanical links between the assemblies. In some examples, the controller instructs the rack assembly to control the steering rack position based on the steering input, such as changes in the steering wheel position. A steering map is used to determine the desired steering rack position based on the current steering wheel position. In some examples, a steering map is selected from a steering map set based on, e.g., the vehicle speed, vehicle direction, driver preference, and the like.

20 Claims, 18 Drawing Sheets

Related U.S. Application Data

No. 17/200,033, filed on Mar. 12, 2021, now Pat. No. 11,052,940.

(51) Int. Cl.
  *B62D 3/12* (2006.01)
  *B62D 5/00* (2006.01)

(58) Field of Classification Search
  USPC .......................................................... 701/41
  See application file for complete search history.

(56) References Cited

U.S. PATENT DOCUMENTS

| | | | |
|---|---|---|---|
| 4,873,475 A | | 10/1989 | Togo et al. |
| 6,098,296 A | | 8/2000 | Perisho, Jr. et al. |
| 6,219,604 B1 | | 4/2001 | Dilger et al. |
| 6,363,305 B1 | | 3/2002 | Kaufmann et al. |
| 6,505,703 B2 | | 1/2003 | Stout et al. |
| 6,535,806 B2 | | 3/2003 | Millsap et al. |
| 6,678,594 B2 | | 1/2004 | Byers et al. |
| 6,678,596 B2 | | 1/2004 | Husain et al. |
| 6,728,615 B1 | * | 4/2004 | Yao ........................ B62D 6/008 |
| | | | 180/443 |
| 6,799,105 B2 | | 9/2004 | Stout et al. |
| 6,896,089 B2 | | 5/2005 | Mills et al. |
| 6,945,353 B2 | | 9/2005 | Bishop |
| 7,032,705 B2 | | 4/2006 | Zheng et al. |
| 7,100,733 B2 | | 9/2006 | Zhao |
| 7,207,411 B2 | | 4/2007 | Duits et al. |
| 7,493,984 B2 | | 2/2009 | Ono et al. |
| 7,698,035 B2 | | 4/2010 | Chino et al. |
| 7,726,439 B2 | | 6/2010 | Akuta et al. |
| 8,046,133 B2 | | 10/2011 | Akuta et al. |
| 8,855,862 B2 | | 10/2014 | Tashiro |
| 9,050,998 B2 | | 6/2015 | Goto et al. |
| 9,199,667 B2 | | 12/2015 | Cairano et al. |
| 9,764,760 B2 | | 9/2017 | Kuramochi |
| 9,802,638 B1 | | 10/2017 | Stoffel et al. |
| 10,000,234 B2 | | 6/2018 | Kim |
| 10,259,495 B2 | | 4/2019 | Badiru |
| 10,259,496 B2 | | 4/2019 | Talamonti et al. |
| 11,052,940 B1 | * | 7/2021 | Narasimhan ........... B62D 6/008 |
| 2003/0164255 A1 | * | 9/2003 | Borroni-Bird ........... B62D 5/00 |
| | | | 180/54.1 |
| 2003/0220727 A1 | * | 11/2003 | Husain ................... B62D 6/008 |
| | | | 180/443 |
| 2005/0082107 A1 | | 4/2005 | Husain et al. |
| 2010/0206208 A1 | * | 8/2010 | Zanfei .................... B63H 25/02 |
| | | | 114/144 RE |
| 2011/0224872 A1 | | 9/2011 | Reed |
| 2011/0244872 A1 | | 10/2011 | Quinn |
| 2012/0072074 A1 | * | 3/2012 | Greul .................... B62D 6/008 |
| | | | 701/41 |
| 2012/0116636 A1 | * | 5/2012 | Dechamp ................ B62D 7/09 |
| | | | 701/42 |
| 2015/0101444 A1 | | 4/2015 | Tanaka |
| 2016/0332625 A1 | | 11/2016 | Fukudome |
| 2018/0237062 A1 | | 8/2018 | Saal et al. |
| 2018/0304921 A1 | * | 10/2018 | Hirate ................. B62D 15/022 |
| 2018/0346018 A1 | | 12/2018 | Kataoka et al. |
| 2019/0039650 A1 | | 2/2019 | Sato et al. |
| 2019/0047618 A1 | | 2/2019 | Hultén |
| 2019/0054916 A1 | | 2/2019 | Akiyama et al. |
| 2019/0084614 A1 | | 3/2019 | Klein et al. |
| 2019/0092376 A1 | | 3/2019 | Panse et al. |
| 2019/0176883 A1 | | 6/2019 | Stanford et al. |
| 2019/0351940 A1 | * | 11/2019 | Kozuka ................ B62D 5/0481 |
| 2019/0367084 A1 | | 12/2019 | Hong |
| 2020/0033858 A1 | | 1/2020 | Xiao |
| 2020/0102001 A1 | * | 4/2020 | Kozuka ................ B62D 5/0403 |
| 2020/0339191 A1 | * | 10/2020 | Polmans .............. B62D 5/0481 |
| 2020/0406964 A1 | * | 12/2020 | Hultén et al. .......... B62D 6/008 |
| 2021/0009143 A1 | | 1/2021 | Niewiadomski et al. |
| 2021/0253159 A1 | * | 8/2021 | Toyoda ................ B62D 5/0418 |

FOREIGN PATENT DOCUMENTS

| | | |
|---|---|---|
| EP | 1215103 B1 | 2/2005 |
| EP | 1304276 B1 | 3/2007 |
| JP | 2006256482 A | 9/2006 |

OTHER PUBLICATIONS

U.S. Appl. No. 17/200,033, Notice of Allowance dated May 24, 2021, 12 pgs.

U.S. Appl. No. 17/650,613, Non Final Office Action dated Apr. 22, 2022, 16 pgs.

U.S. Appl. No. 17/650,618, Non Final Office Action dated May 10, 2022, 9 pgs.

International Application Serial No. PCT/US22/70421, Search Report and Written Opinion dated May 12, 2022, 9 pgs.

U.S. Appl. No. 17/650,613, Examiner Interview Summary dated May 24, 2022, 2 pgs.

U.S. Appl. No. 17/650,616, Non Final Office Action dated May 25, 2022, 12 pgs.

U.S. Appl. No. 17/650,618, Notice of Allowance dated May 31, 2022, 9 pgs.

\* cited by examiner

| Steering Input Torque Map 160 ||
| Steering Wheel Torque Values | Steering Rack Adjustment Rate Values |
| --- | --- |
| 0 N-m | 0 mm/sec |
| 0.1 N-m | 0 mm/sec |
| 0.5 N-m | 0 mm/sec |
| 1 N-m | 5 mm/sec |
| 2 N-m | 10 mm/sec |
| 5 N-m | 30 mm/sec |
| 10 N-m | 60 mm/sec |

| Steering Feedback Torque Map 165 | | | | |
|---|---|---|---|---|
| Steering Wheel Rotation Speed Values | Rack Speed | Rack Force | Vehicle Speed Value | Resistive Torque Target Value |
| 10°/sec | 10 mm/sec | < 2kN | 10 mph | 0 N-m |
| 400°/sec | 1050 mm/sec | 2 – 5 kN | 20 mph | 20 N-m |
| ... | ... | ... | ... | ... |
| ... | ... | ... | ... | ... |

| Steering Alignment Map 175 | | | | | |
|---|---|---|---|---|---|
| Rack Position Difference Value | Steering Angle Difference | Propulsion Inhibited | Vehicle Speed Value | Steering Wheel Position Change Value | Steering Rack Position Change Value |
| 1 mm | 0 deg | Yes | 0 mph | | |
| 1 mm | 2 deg | No | 10 mph | | |
| 5 mm | 5 deg | Yes | 0 mph | | |
| 5 mm | 90 deg | Yes | 0 mph | | | ved, as

STEER-BY-WIRE SYSTEMS AND METHODS OF OPERATING THEREOF IN VEHICLES

CROSS-REFERENCE TO RELATED APPLICATIONS

This application is a continuation of U.S. patent application Ser. No. 17/336,513, filed on 2021 Jun. 2, which is a continuation of U.S. patent application Ser. No. 17/200,033 filed on 2021 Mar. 12 and granted as U.S. Pat. No. 11,052,940 on 2021 Jul. 6, both of which are incorporated herein by reference in their entirety for all purposes.

BACKGROUND

Conventional steering systems utilize direct mechanical links between the steering wheels and road wheels (e.g., front steerable wheels). These links are used to translate the steering input to the turning of road wheels while maintains the steering alignment, which is the alignment between the steering wheels and the corresponding steerable road wheels. This steering system type will be referred to as a mechanically-linked system to differentiate it from other types of steering systems that do not have such mechanical links.

Unlike mechanically-linked systems, steer-by-wire systems do not have such mechanical links between their steering wheels and road wheels. While this lack of mechanical connection presents some challenges (e.g., maintaining the steering alignment), it also provides new design and operating opportunities, in comparison to mechanically-linked systems. For example, the steering wheels and the road wheels can be independently controlled to provide improved vehicle operations across different driving conditions (e.g., different speeds, driving in reverse, and the like) and integration of new vehicle systems (e.g., autonomous driving). Furthermore, this lack of mechanical connection opens door to new positions of the steering wheel in a vehicle, independent from the position of steering wheels, thereby greatly increase flexibility in cabin packaging.

SUMMARY

Described herein are steer-by-wire systems and methods of operating these systems. A steer-by-wire system comprises a steering wheel assembly and a rack assembly. The steering wheel assembly comprises a steering wheel, sensors, and an actuator. The rack assembly comprises a steering rack, sensors, and a rack actuator. The two assemblies are communicatively coupled by a steer-by-wire system controller, which may comprise two sub-controllers, without having any direct mechanical links between the assemblies. In some examples, the controller instructs the rack assembly to control the steering rack position based on the steering input, such as changes in the steering wheel position. For example, a steering map is used to calculate the steering rack position target based on the current steering wheel position. In some examples, a steering map is selected from a steering map set based on, e.g., the vehicle speed, vehicle direction, driver preference, and the like.

BRIEF DESCRIPTION OF THE DRAWINGS

The description will be more fully understood with reference to the following figures, which are presented as examples of the disclosure and should not be construed as a complete recitation of the scope of the disclosure, wherein.

DETAILED DESCRIPTION

In the following description, numerous specific details are outlined to provide a thorough understanding of the presented concepts. In some examples, the presented concepts are practiced without some or all of these specific details. In other instances, well-known process operations have not been described in detail so as not to unnecessarily obscure the described concepts. While some concepts will be described in conjunction with the specific examples, it will be understood that these examples are not intended to be limiting.

INTRODUCTION

A steer-by-wire system presents various new design options as well as vehicle operating options, which are not possible with conventional mechanically-linked steering systems. By removing the mechanical link, the steer-by-wire system enables various independent controls of the steering wheel and the road wheels. For example, the road wheels are turned using the steering rack. The steering rack position is controlled based on the steering wheel position, e.g., using specially designed steering maps. The same steering map may have multiple steering rack position options for the same steering wheel position. One of these steering rack position options is selected or, more specifically, interpolated (e.g., using an interpolation function) based on one or more additional factors (e.g., vehicle speed). As a result, both the vehicle controllability (e.g., at high speeds) and the vehicle responsiveness (e.g., at low speeds) can be independently controlled across various operating conditions.

Figure 1A:
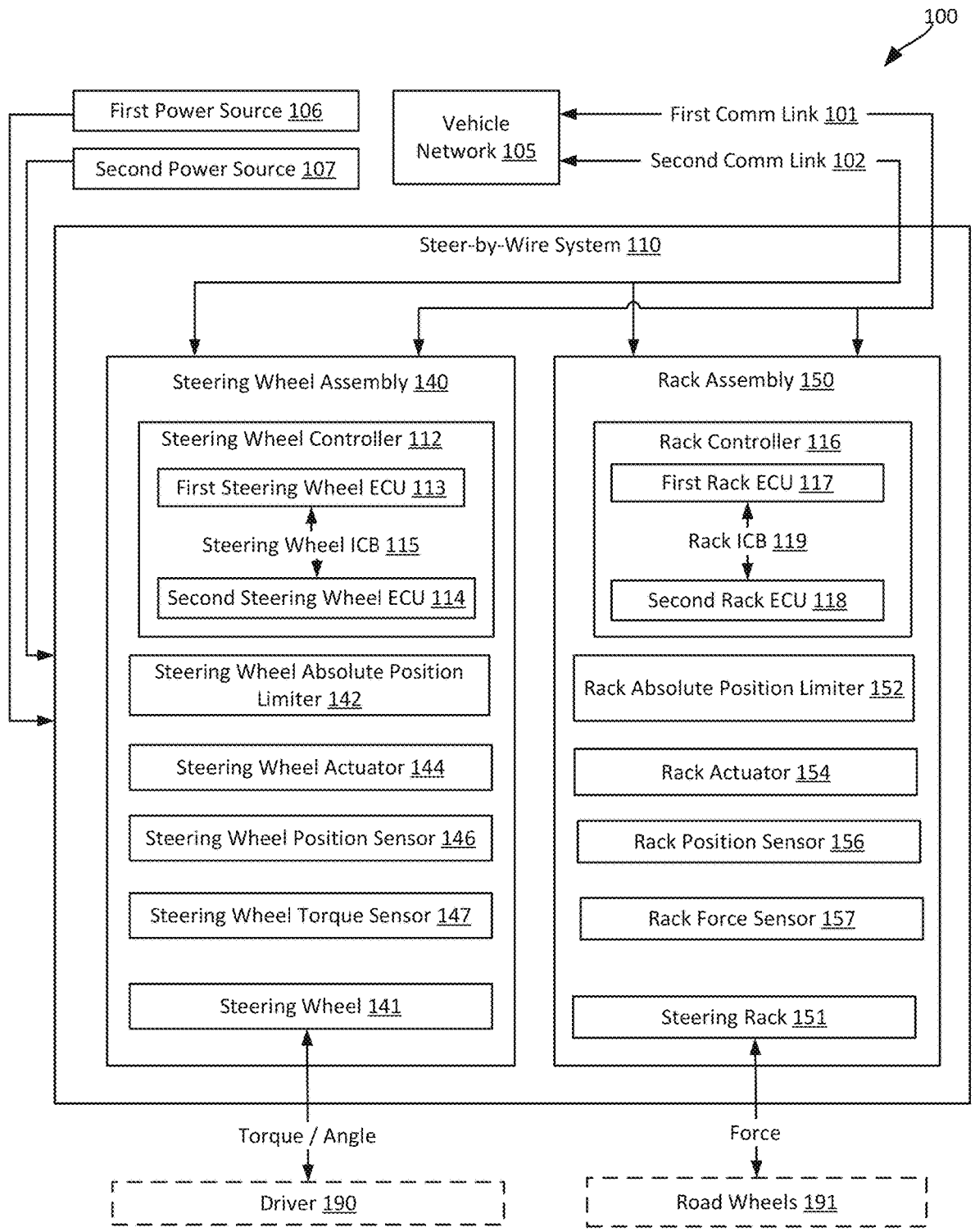
FIG. 1A is a block diagram of a vehicle, comprising a steer-by-wire system, in accordance with some examples.
Figure 1B:
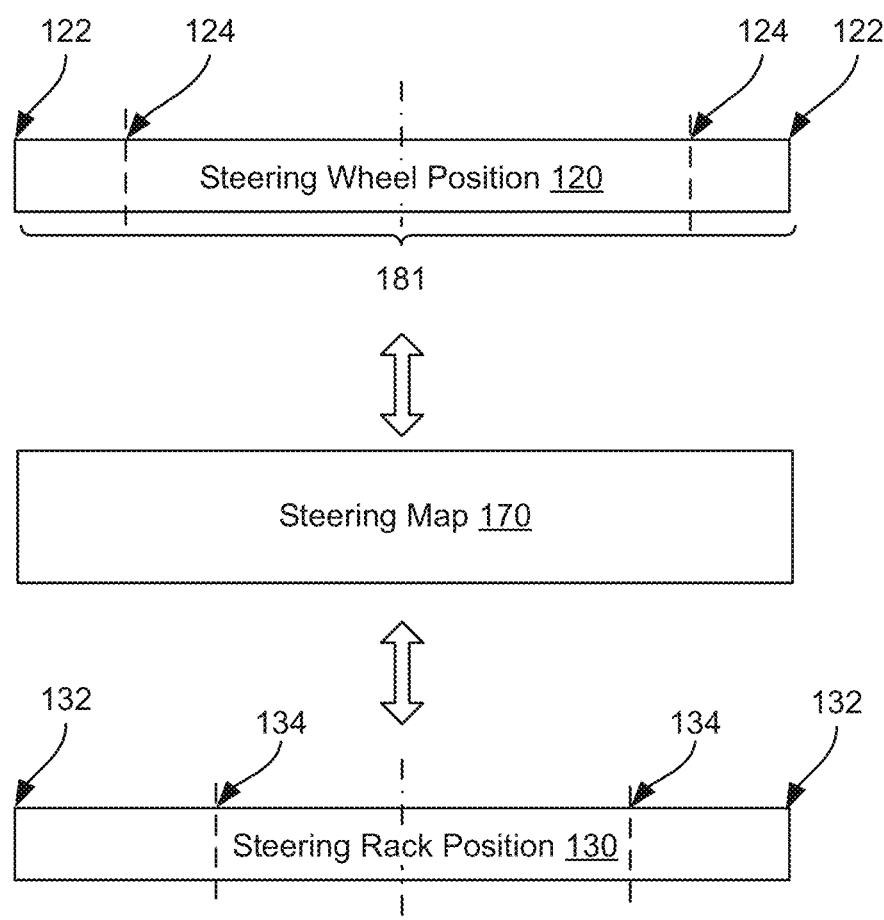
FIG. 1B is a schematic diagram illustrating a steering map, used for aligning the steering wheel and the steering rack, in accordance with some examples.

A brief description of a steer-by-wire system is presented below with reference to FIGS. 1A-1C. Specifically, FIG. 1A is a schematic block diagram of vehicle 100, comprising steer-by-wire system 110, in accordance with some examples. Steer-by-wire system 110 is configured to communicate with other vehicle systems, which may be collectively referred to as vehicle network 105. Some examples of these systems include, but are not limited to a brake module, a powertrain module, a battery control module, an advanced driver-assistance system (ADAS) module, restraints & airbag module. The communication between vehicle network 105 and steer-by-wire system 110 is provided using one or more communication links, such as first communication link 101 and second communication link 102. Some examples of these communication links include, but are not limited to, controller area network (CAN) buses, Ethernet bus systems, local interconnected networks (LIN), FlexRay bus systems, optical fiber systems, dedicated hardware connections, and various wireless systems (e.g., Bluetooth, Wi-Fi).

Steer-by-wire system 110 is configured to receive the power from multiple power sources (e.g., first power source 106 and second power source 107). For example, first power source 106 and second power source 107 may be two independent low-voltage batteries (e.g., 12V batteries, 48V batteries). In some examples, one or more power sources may be a high-voltage battery (e.g., 400V-800V batteries in electrical vehicles) connected to steer-by-wire system 110 through a DC-DC power converter. Other examples include a capacitor (e.g., as a temporary power source) and the like.

Referring to FIG. 1A, steer-by-wire system 110 comprises steering wheel assembly 140 and rack assembly 150. Steering wheel assembly 140 comprises steering wheel controller 112, steering wheel 141, steering wheel absolute position limiters 142, steering wheel actuator 144, steering wheel position sensor 146, and steering wheel torque sensor 147. Similarly, rack assembly 150 comprises rack controller 116, steering rack 151, rack absolute position limiters 152, rack actuator 154, rack position sensor 156, and rack force sensor 157. These components may be implemented in software and/or hardware. For example, rack force sensor 157 may be a software-based estimator using, e.g., the electrical current drawn by rack actuator 154 as an input. Steering wheel controller 112 is configured to receive input from various components of steering wheel assembly 140 (e.g., steering wheel position sensor 146 and steering wheel torque sensor 147) and to provide output to the same or other components (e.g., steering wheel actuator 144). Likewise, rack controller 116 is configured to receive input from various components of rack assembly 150 (e.g., rack position sensor 156 and rack force sensor 157) and to provide output to the same or other components (e.g., rack actuator 154).

Steering wheel controller 112 and rack controller 116 are configured to communicate with each other, e.g., to synchronize the operation of steering wheel assembly 140 and rack assembly 150. Furthermore, steering wheel controller 112 and rack controller 116 are configured to communicate with vehicle network 105. First communication link 101 and second communication link 102 may be used for various types of communications within vehicle 100.

Steering wheel controller 112 comprises first steering wheel ECU 113 and second steering wheel ECU 114. The two ECUs ensure the continuous operation of steer-by-wire system 110, e.g., if one ECU becomes unavailable. Steering wheel controller 112 also comprises steering wheel internal-communication bus (ICB) 115, communicatively coupling and providing a direct communication link between first steering wheel ECU 113 and second steering wheel ECU 114. As such, first steering wheel ECU 113 and second steering wheel ECU 114 may redundantly communicate internally within steering wheel controller 112 (using steering wheel ICB 115) and/or externally (using first communication link 101 and second communication link 102 and one or more ECUs in vehicle network 105 as a gateway). For example, first steering wheel ECU 113 may be communicatively coupled to first communication link 101, while second steering wheel ECU 114 may be communicatively coupled to second communication link 102.

Rack controller 116 comprises first steering rack ECU 117 and second steering rack ECU 118, e.g., to ensure continuous operation if one of the ECU becomes unavailable. Rack controller 116 comprises rack ICB 119, communicatively coupled and providing a direct communication link between first steering rack ECU 117 and second steering rack ECU 118. As such, first steering rack ECU 117 and second steering rack ECU 118 may communicate internally within rack controller 116 (using rack ICB 119) and/or externally (e.g., using first communication link 101 and second communication link 102 and one or more ECUs in vehicle network 105 as a gateway). For example, first steering rack ECU 117 may be communicatively coupled to first communication link 101, while second steering rack ECU 118 may be communicatively coupled to second communication link 102.

Steering wheel 141 is used by driver 190 to provide steering input. For example, driver 190 rotates steering wheel 141, thereby changing the angular position of steering wheel 141, to control the driving direction of vehicle 100.

The angular position of steering wheel 141 is registered by steering wheel position sensor 146 and transmitted to steering wheel controller 112.

Steering wheel absolute position limiters 142 are mechanical components, which come in contact with corresponding components on steering wheel 141 when steering wheel 141 is rotated to some degree (e.g., from the center position). Steering wheel absolute position limiters 142 determine absolute steering wheel limits 122, which may be also referred to as mechanical steering wheel limits. Absolute steering wheel limits 122 are schematically shown in FIG. 1B.

Steering wheel actuator 144 may be an electrical motor, coupled to steering wheel 141 (e.g., using a steering column). Steering wheel actuator 144 is operable to rotate steering wheel 141, e.g., to control steering wheel position 120. In some examples, steering wheel actuator 144 is also operable to apply a set torque to steering wheel 141, e.g., based on various maps and features described below, provided as instructions from steering wheel controller 112.

In some examples, steering wheel actuator 144 is configured to set tunable steering wheel limits 124. Referring to FIG. 1B, tunable steering wheel limits 124 are within absolute steering wheel limits 122 and are used to further limit or at least resist the rotation of steering wheel 141 before reaching absolute steering wheel limits 122. Tunable steering wheel limits 124 are actively controlled by steering wheel controller 112. Various examples of this control are described below, e.g., with reference to steering map 170 presented in FIG. 2C. Tunable steering wheel limits 124 may be also referred to as virtual steering wheel angle range limiters.

Steering wheel position sensor 146 is configured to measure changes in the angular position of steering wheel 141. For example, steering wheel position sensor 146 may be positioned on a steering column, which supports steering wheel 141. Similarly, steering wheel torque sensor 147 is configured to measure the torque applied by driver 190 to steering wheel 141. For example, steering wheel torque sensor 147 may be positioned on a steering column, which supports steering wheel 141. In some examples, steering wheel position sensor 146 and steering wheel torque sensor 147 may be integrated into the same hardware components.

Now referring to the components of rack assembly 150, steering rack 151 is mechanically coupled to road wheels 191 and is used to change the angle of road wheels 191 thereby allowing vehicle 100 to turn. Steering rack 151 is mechanically coupled to rack actuator 154, which is used to change the position of steering rack 151, e.g., based on the input from rack controller 116.

Rack absolute position limiters 152 are mechanical components, which come in contact with corresponding components of steering rack 151 thereby limiting the position of steering rack 151 and the angle of road wheels 191. Rack absolute position limiters 152 determine the maximum travel of steering rack 151 and may be referred to as mechanical rack limits.

Rack actuator 154 is mechanically coupled to rack assembly 150 and is used to change the position of rack assembly 150, e.g., between rack absolute position limiters 152. Rack actuator 154 may include an electrical motor or an electrical linear actuator. Referring to FIG. 1B, In some examples, rack actuator 154 travels between tunable steering rack limits 134, which are positioned within the range set by rack absolute position limiters 152. Tunable steering rack limits 134 are set by one of the controllers, e.g., based on steering map 170.

Rack position sensor 156 is configured to measure changes in the position of steering rack 151. For example, rack position sensor 156 may be positioned on or integrated into steering rack 151 and/or rack actuator 154. Similarly, rack force sensor 157 is configured to estimate or measure the force with which road wheels 191 affect the movement of steering rack 151. Rack force sensor 157 may be positioned on or integrated into steering rack 151 and/or can be estimated by measuring related measurements, such as current and position.

Figure 1C:
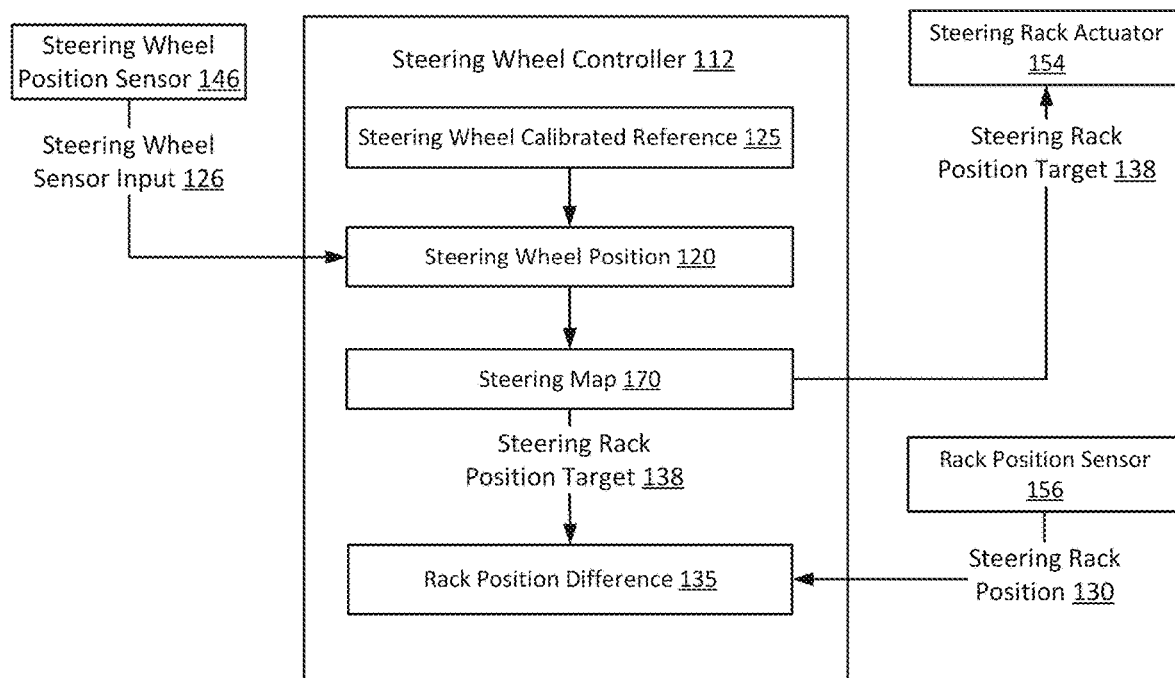
FIG. 1C is a block diagram illustration of various data transfers in the steer-by-wire system while aligning the steering wheel and the steering rack, in accordance with some examples.

Some examples of data flow in steer-by-wire system 110 are illustrated in FIG. 1C. Specifically, steering wheel position sensor 146 registers and transmits steering wheel position sensor input 126 (representing changes in the angular position of steering wheel 141) to steering wheel controller 112. In some examples, steering wheel position sensor input 126 may be also referred to as a relative steering wheel position or a relative position. Steering wheel controller 112 combines this steering wheel position sensor input 126 with steering wheel calibrated reference 125 to determine actual steering wheel position 120. Steering wheel calibrated reference 125 may be referred to as a zero-reference or calibration. Steering wheel position 120 may be also referred to as an absolute position. Alternatively, steering wheel position 120 is provided by steering wheel position sensor 146 (e.g., when steering wheel position sensor 146 can maintain its own calibrated reference).

Steering wheel position 120 is then used to determine or, more specifically, to calculate steering rack position target 138 based on steering map 170. Steering rack position target 138 is then transmitted to rack actuator 154, e.g., to move steering rack 151. This procedure may be performed in reverse as well if there is the movement of the rack due to external forces. Rack position sensor 156 measures and returns steering rack position 130 to one or more controllers, such as steering wheel controller 112. A combination of steering rack position 130 and steering rack position target 138 may be used to determine rack position difference 135, used for various functions described below and schematically shown in FIG. 1C. In some examples, steering rack position 130 is determined at rack controller 116, e.g., based on the sensor input from rack position sensor 156 and in the manner similar to determining steering wheel position 130, described above.

Steering Map Examples and Methods of Using Thereof

Figure 2A:
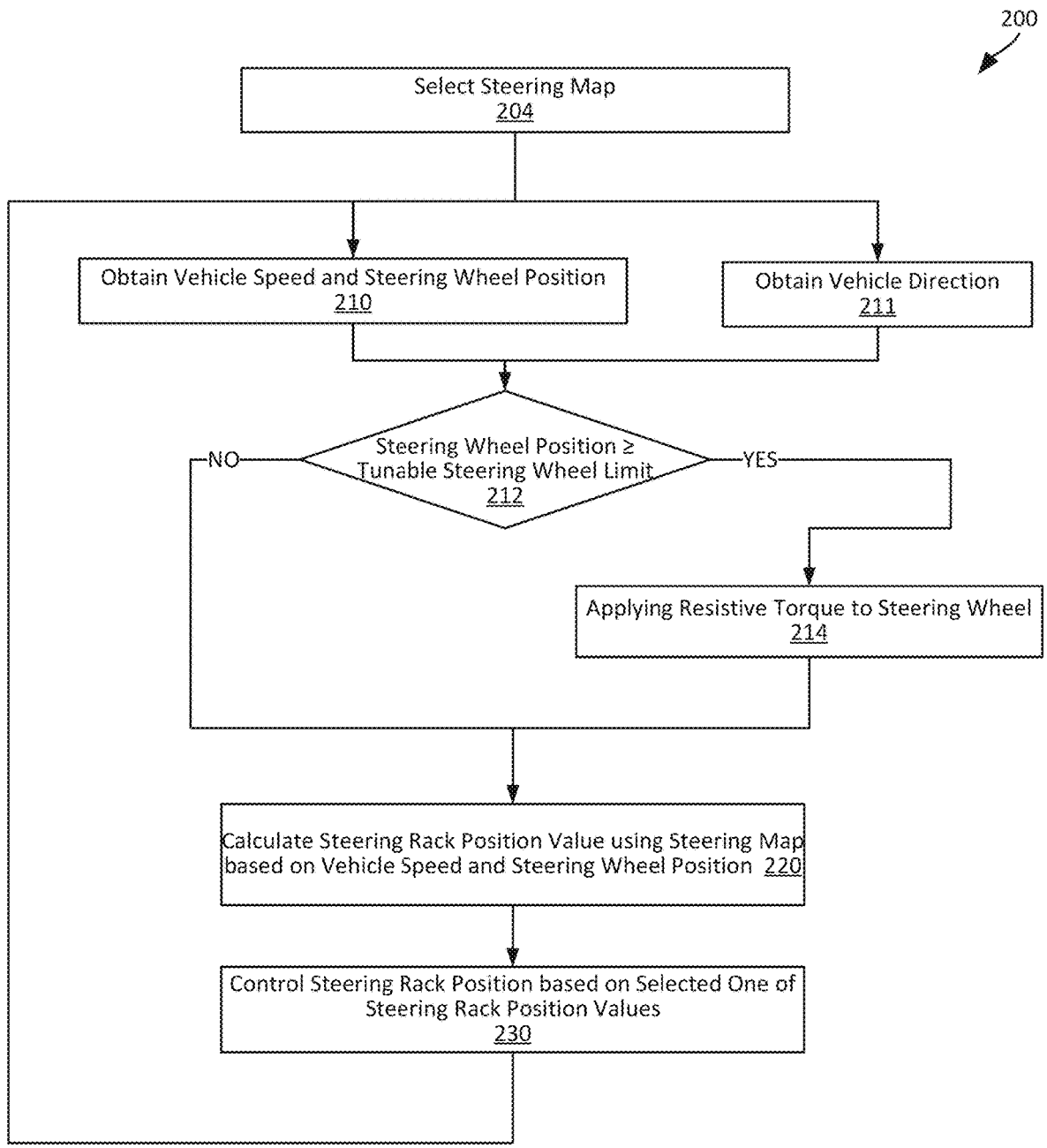
FIG. 2A is a process flowchart corresponding to a method of controlling the steering rack position based on the steering input, in accordance with some examples.
Figure 2B:
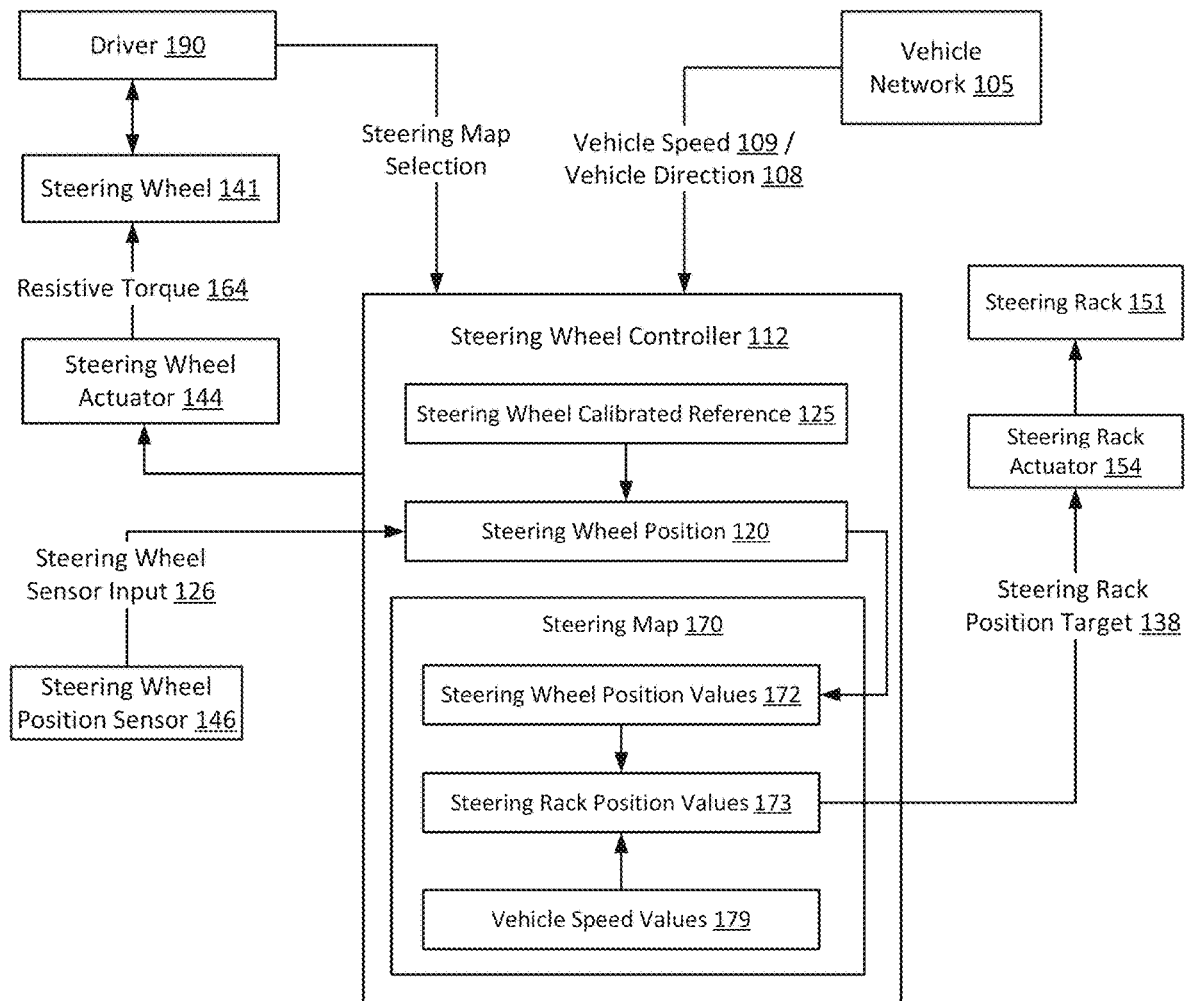
FIG. 2B is a block diagram illustration of various data transfers in the steer-by-wire system while selecting and using steering maps, in accordance with some examples.

As described above with reference to FIGS. 1B and 1C, steering rack position 130 is controlled at least in part based on steering wheel position 120 using steering map 170. Unlike mechanical links in conventional steering systems, steering map 170 provides new control options in steer-by-wire system 110, e.g., different relationships between steering wheel position 120 and steering rack position 130 for different vehicle operating conditions. FIG. 2A illustrates a process flowchart corresponding to method 200 of controlling steering rack position 130 based on steering wheel position 120 using steering map 170. FIG. 2B is a block diagram illustration of various data transfers in steer-by-wire system 110 while selecting and using steering map 170, in accordance with some examples. Finally, FIG. 2C illustrates one example of steering map 170.

Figure 2C:
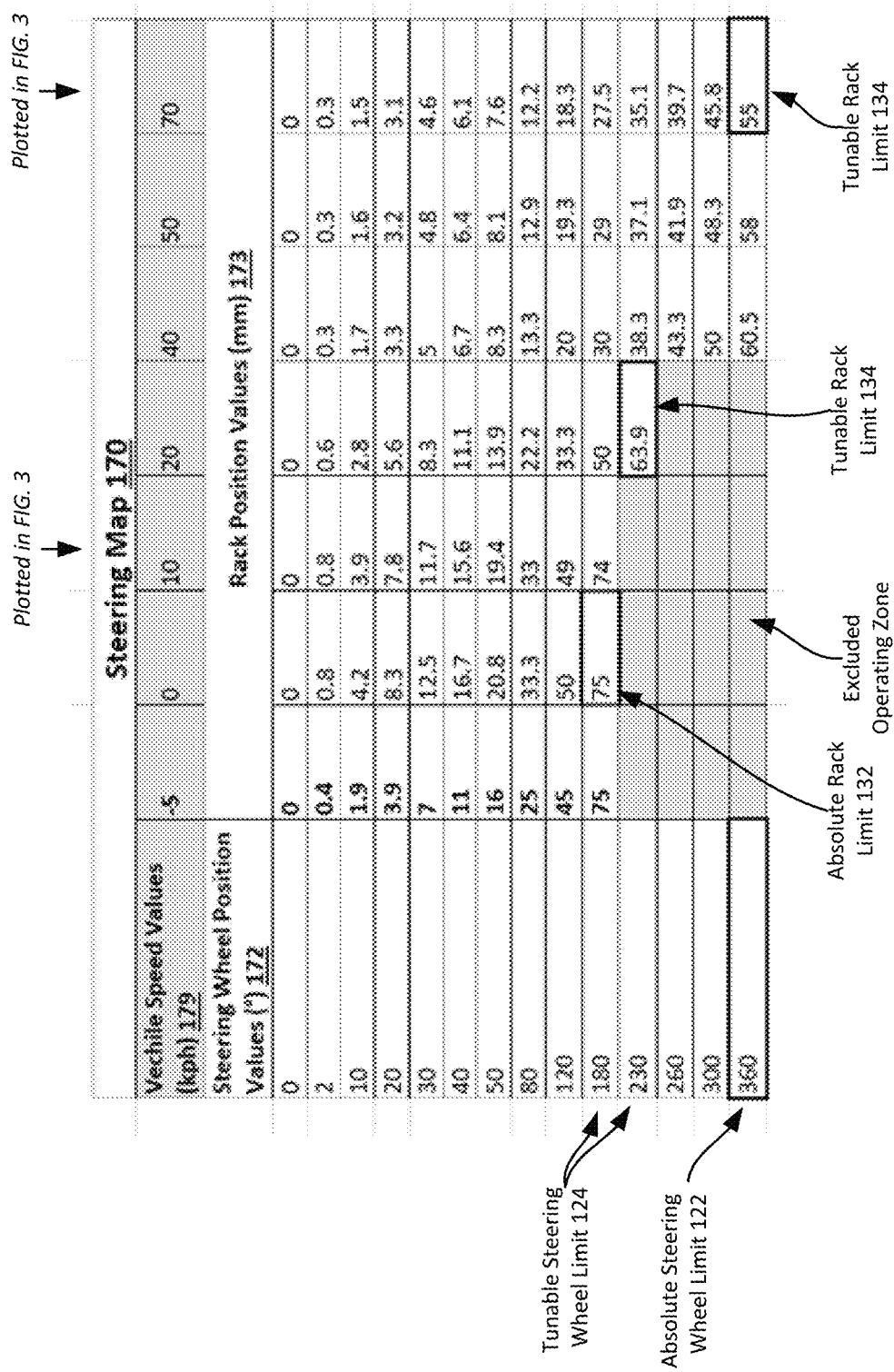
FIG. 2C is one example of a steering map, used for aligning the steering wheel and the steering rack.

Referring to FIG. 2C, steering map 170 comprises steering rack position values 173, vehicle speed values 179, and steering wheel position values 172. Each of the steering rack position values 173 corresponds to a unique combination of one of vehicle speed values 179 and one of steering wheel position values 172. These values are used to determine or, more specifically, to interpolate steering rack position target

138 based on steering map 170. As noted above, steering rack position target 138 is then transmitted to rack actuator 154 for adjusting steering rack position 130. Steering map 170 also sets various tunable steering wheel limits 124 and tunable steering rack limits 134, which are also vehicle speed dependent. In general, steering map 170 can be used to have a slower steering response at higher vehicle speeds (e.g., to improve controllability) and also to have a faster steering response at lower vehicle speeds (e.g., to enhance vehicle responsiveness).

Returning to FIG. 2A, in some examples, method 200 comprises (block 204 in FIG. 2A) selecting steering map 170 from a steering map set, e.g., based on at least one of driver's preference, vehicle use (e.g., towing), road condition (e.g., snow, rain), signals from vehicle network 105 (e.g., availability of the speed input and direction), and the like. For example, different drivers may prefer different types of steering feel and steering response and may choose corresponding steering maps from a steering map set. This selection may be linked for example to a driver identity. In some examples, steer-by-wire system 110 is configured to change steering maps, based on various system feedbacks.

In some examples, method 200 comprises (block 210 in FIG. 2A) obtaining vehicle speed 109 and steering wheel position 120. For example, vehicle speed 109 may be obtained by steer-by-wire system 110 or, more specifically, by steering wheel controller 112 from vehicle network 105 as, e.g., is schematically shown in FIG. 2B. Steering wheel position 120 may be monitored by steering wheel position sensor 146 or determined by steering wheel controller 112 using steering wheel position sensor input 126 from steering wheel position sensor 146.

In some examples, method 200 also comprises (block 211) obtaining vehicle direction 108, e.g., from vehicle network 105. The vehicle direction may be a part of the vehicle speed signal, e.g., from a wheel speed sensor. For example, the sign of the vehicle speed signal (e.g. positive for forward, negative for reverse) may indicate the direction. In some examples, the vehicle direction is computed from a set of separate signals (e.g., the gear selection (P-R-N-D), powertrain motor torque direction).

In some examples, method 200 comprises, when (decision block 212) steering wheel position 120 is at or above one of tunable steering wheel limits 124, applying (block 214) resistive torque 164 to steering wheel 141. As further described above with reference to FIG. 2C, steering map 170 may have tunable steering wheel limits 124 for some vehicle speed values 179. Tunable steering wheel limits 124 are defined as the maximum controlled limit of steering wheel position value 172 for each speed value and for which the corresponding target rack position is defined. It should be noted that in some examples, one or more tunable steering wheel limits 124 may coincide with absolute steering wheel limits 122. Tunable steering rack limits 134 are defined as the maximum controlled limit of rack position value 173 in steering map 170.

This sub-process may involve checking if tunable steering wheel limit 124 exists for vehicle speed 109, obtained earlier. If this tunable steering wheel limit 124 exists, then method 200 proceeds with checking if steering wheel position 120 is at tunable steering wheel limit 124 or exceeds this tunable steering wheel limit 124. If tunable steering wheel limit 124 is reached or exceeded, then a resistive torque is applied to inhibit further rotation of steering wheel 141 in that direction.

Method 200 proceed with (block 220 in FIG. 2A) calculating steering rack position target 138 from steering map 170 based on vehicle speed 109 and steering wheel position 120. It should be noted that the adaptability of steer-by-wire system 110 (provided by steering map 170 as opposed to mechanical linkage in conventional steering systems) is not limited to vehicle speeds. For example, steering map 170 may account for other factors, such as vehicle direction (e.g., forward vs. reverse), driver's preference, road conditions (e.g., dry vs. wet road), and the like. Some of these examples are further described below.

Method 200 then proceeds with (block 230) controlling steering rack position 130 based on steering rack position target 138. For example, steering wheel controller 112 instructs rack actuator 154 to move steering rack 151 based on steering rack position target 138, e.g., as schematically sown in FIG. 2B.

Referring to FIG. 2C, steering map 170 comprises steering wheel position values 172, corresponding to absolute steering wheel limit 122 and tunable steering wheel limits 124. Furthermore, steering map 170 comprises steering rack position values 173, corresponding to absolute steering rack limit 132 and tunable steering rack limits 134. In some examples, the differences between steering wheel position values 172, corresponding to tunable steering wheel limits 124 and absolute steering wheel limit 122, decrease as vehicle speed 109 increases. In some examples, the differences between steering rack position values 173, corresponding to tunable steering rack limits 134 and absolute steering rack limits 132, increase as vehicle speed 109 increases. Furthermore, in some examples, at least one of vehicle speed values 179 of steering map 170 has corresponding values for both tunable steering wheel limits 124 and tunable steering rack limits 134. In some examples, at least one of vehicle speed values 179 of steering map 170 has a corresponding value of tunable steering wheel limits 124 and no corresponding values of tunable steering rack limits 134. In some examples, at least one of speed values 179 of steering map 170 has a corresponding value of tunable steering rack limits 134 but no corresponding values of tunable steering wheel limits 124. In some examples, steering the steering map 170 has different rack travel-to-steering wheel ratios for different vehicle speed values 179. As such, in the examples, the rack travel-to-steering wheel ratios decrease as vehicle speed values 179 increase.

When the vehicle direction 108 is a separate input, one of the steering rack position values 173 is further selected based on the vehicle direction, in addition to vehicle speed 109 and steering wheel position 120 as further described below. For example, steering map 170 may have a specific set of steering rack position values 173, corresponding to the reverse movement as shown in FIG. 2C. In these examples, when the vehicle direction is reverse, one of steering rack position values 173 (from this "reverse" column) may be used as steering rack position target 138 or used to calculate/interpolate steering rack position target 138. For example, at reverse speeds between 0 kilometers-per-hour (kph) and −5 kph, steering rack position target 138 may be interpolated using values in the "0 kph"-column and also in the "−5 kph" column (e.g., using an average for a speed of −2.5 kph). However, for reverse speeds at or above (based on the absolute value) −5 kph, steering rack position values 173 in the "−5 kph" column may be used as steering rack position target 138.

Figure 3:
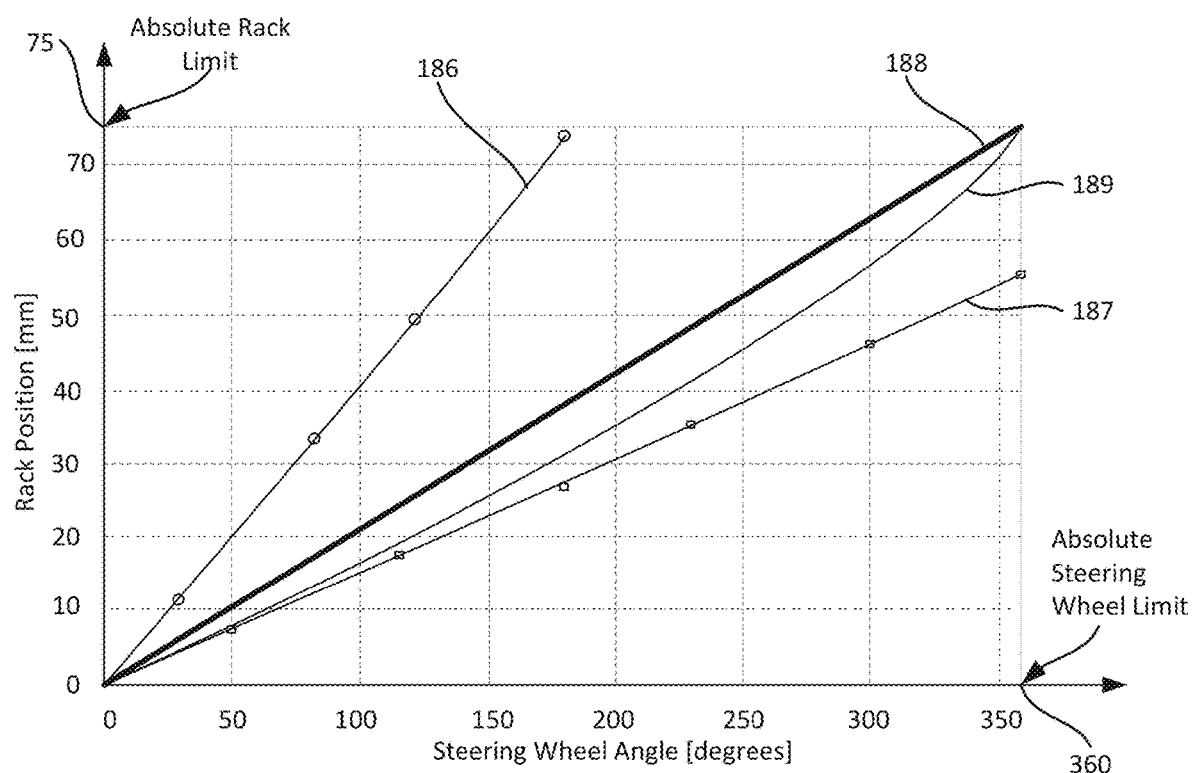
FIG. 3 is a plot of the rack position as a function of the steering wheel angle for different steering systems and different vehicle speeds, in accordance with some examples.

Two subsets of steering wheel position values 172 and corresponding steering rack position values 173 in steering map 170 are presented graphically in FIG. 3. These values represent vehicle speeds of 10 kph (line 186) and 70 kph (line 187). Specifically, the line positions or, more specifically, the line slopes in FIG. 3 illustrate the difference in the performance of steer-by-wire system 110 at different speeds. The line slopes are representative of a "C-factor" in conventional steering systems. Specifically, the "C-factor" is defined as a rack travel per full revolution of the steering wheel (e.g., 75 mm per 360°). As a reference, FIG. 3 also illustrates line 188, corresponding to a conventional constant C-factor system, and line 189, corresponding to a conventional variable C-factor system. In the constant C-factor steering system, the ratio of the rack travel-to-steering wheel rotation is constant (i.e., line 188 being straight/constant slope). In the variable C-factor steering system, this ratio varies with the steering wheel angle (i.e., line 189). However, typically, no other conditions influence this relationship due to the mechanical linkage between the steering wheel and the rack. Furthermore, in conventional systems, both the steering wheel and the steering rack are allowed to travel to their mechanical limits (i.e., both line 188 and line 189 ends at the same point).

Examples of Determining Steering Wheel Positions (Absolute Angle)

In some examples, steering wheel controller 112 (or steering wheel position sensor 146) can retain steering wheel position 120 only while the power is supplied to steering wheel controller 112 (or steering wheel position sensor 146). More specifically, steering wheel controller 112 can retain steering wheel calibrated reference 125, which may be referred to as an absolute steering wheel angle reference or an absolute reference. As noted above, steering wheel calibrated reference 125 is then combined with steering wheel position sensor input 126, which may be referred to as a relative angle, to obtain steering wheel position 120. Steering wheel controller 112 then uses steering wheel position 120 to calculate steering rack position target 138, which is sent to rack actuator 154 to change steering rack position 130.

As such, when no power is supplied to steering wheel controller 112 (or steering wheel position sensor 146), e.g., while vehicle batteries are removed or discharged below a set threshold, steering wheel calibrated reference 125 may be lost and steering wheel position 120 cannot be determined. Furthermore, steering wheel 141 may be turned without steering wheel position sensor 146 being able to register the change in steering wheel position 120 (e.g., if steering wheel 141 is rotated while vehicle 100 is switched off and steer-by-wire system 110 is unpowered). Such situations may be referred to as a loss of steering wheel calibrated reference 125 as, as a result, a loss of the steering wheel's absolute angle.

Figure 4A:
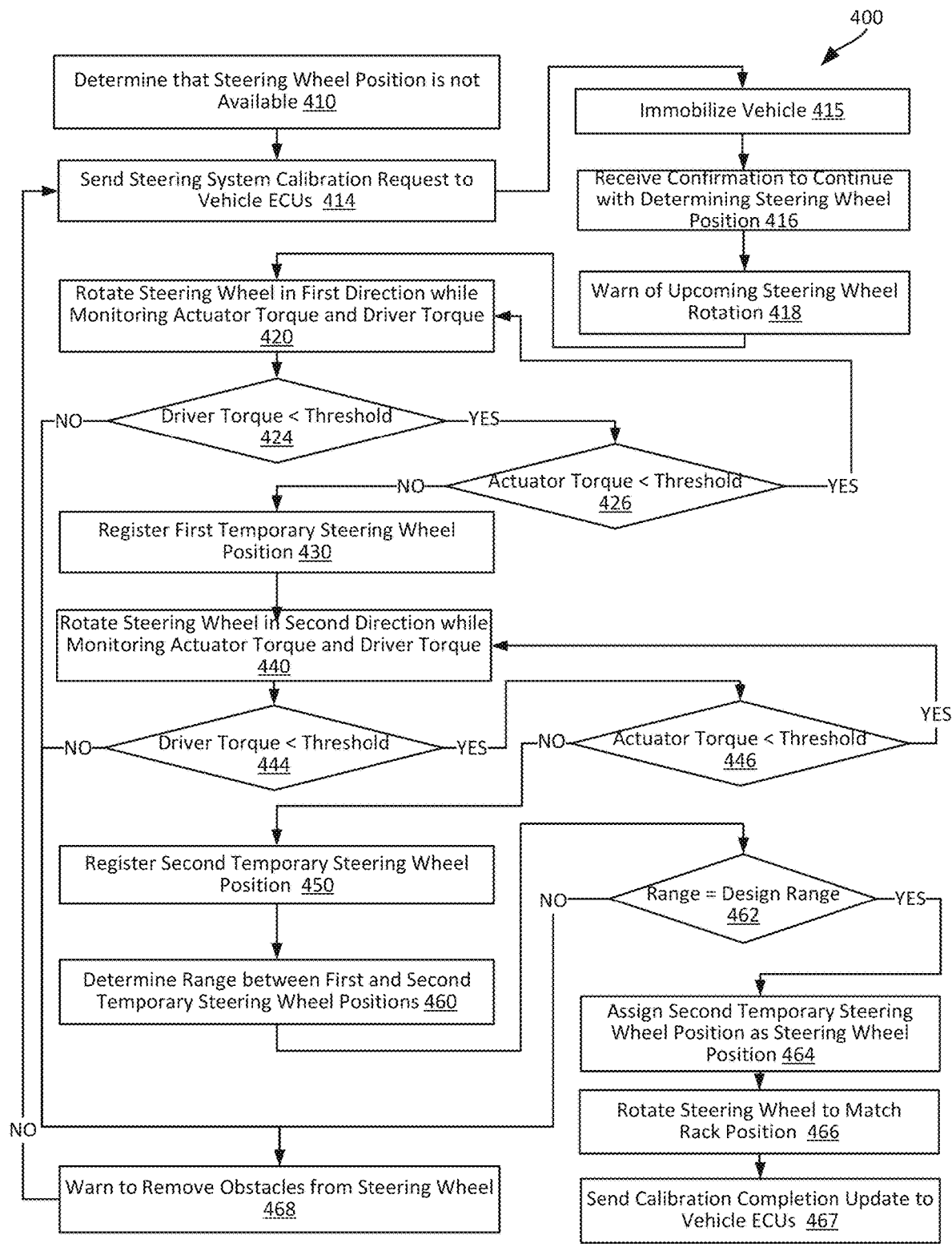
FIG. 4A is a process flowchart corresponding to a method of determining a steering wheel position, in accordance with some examples.

Without steering wheel position 120, the operation of steer-by-wire system 110 will be limited. For example, steering map 170 uses steering wheel position 120 to select steering rack position value 173, which is used to control steering rack position 130. Finally, periodic calibration of steering wheel position 120 may be needed or the process may be triggered externally (e.g., as a part of vehicle maintenance). FIG. 4A is a process flowchart corresponding to method 400 of determining a steering wheel position 120, in accordance with some examples.

In some examples, method 400 commences with steering wheel controller 112 determining (block 410 in FIG. 4A) that steering wheel position 120 is not available. For example, steering wheel controller 112 may check its memory for steering wheel calibrated reference 125 and determine that steering wheel calibrated reference 125 is not present.

Method 400 proceeds with sending (block 414 in FIG. 4A) a steering system calibration request to vehicle network 105. This calibration request indicates the limited availability of steer-by-wire system 110. This calibration request may be used by vehicle network 105 to stop various operations (e.g., prevent the vehicle movement), inform the driver about upcoming operations (e.g., the rotation of steering wheel 141), and other vehicle systems to put vehicle 100 in a normal operating state. For example, method 400 may comprise immobilizing (block 415) vehicle 100 by vehicle network 105. In response to this calibration request, vehicle network 105 sends a confirmation to steering wheel controller 112 to continue with determining steering wheel position 120.

Method 400 proceeds with steering wheel controller 112 receiving (block 416 in FIG. 4A) the confirmation (e.g., from one or more vehicle network 105) to continue with determining steering wheel position 120. At this point, vehicle 100 is ready to perform other operations, e.g., vehicle 100 is immobilized, driver 190 is informed, and the like. In some examples, method 400 comprises warning (block 418) driver 190 that steering wheel 141 will start rotating shortly. For example, driver 190 may be informed to remove his/her hands from steering wheel 141 and/or other objects that may interfere with the rotation of steering wheel 141, e.g., to complete the calibration.

Figure 4B:
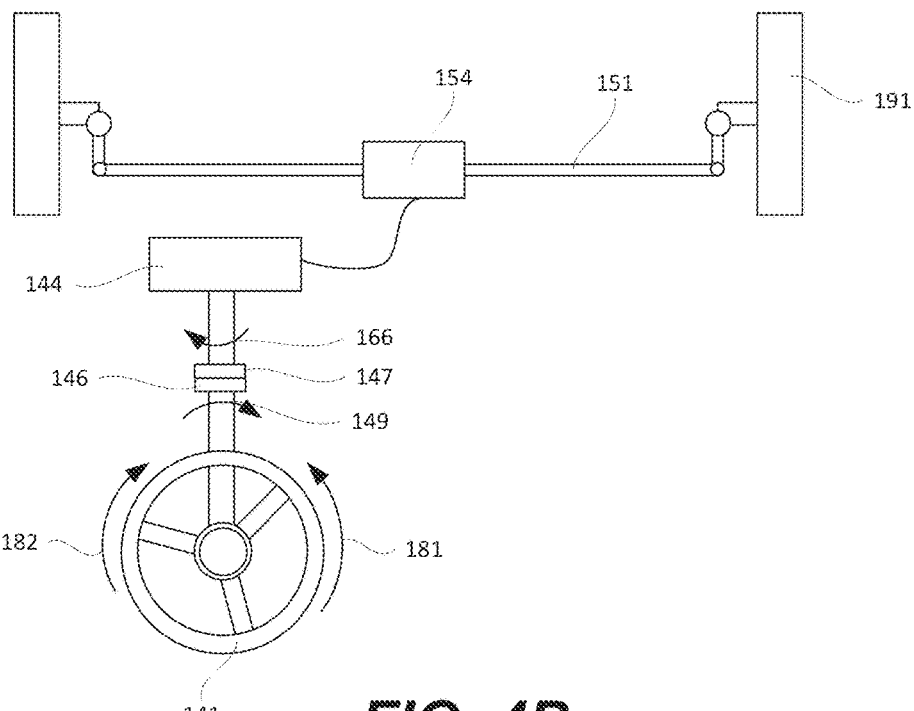
FIG. 4B is a schematic illustration of different vehicle components used in the method of determining a steering wheel position, in accordance with some examples.

Method 400 proceeds with rotating (block 420 in FIG. 4A) steering wheel 141 in first direction 181 (e.g., counterclockwise) while monitoring steering wheel actuator torque 166 and driver torque 149. Steering wheel actuator torque 166 is the torque applied by steering wheel actuator 144 and may be referred to as the actuator-side torque. Steering wheel actuator torque 166 should be distinguished from driver torque 149, which may be referred to as driver-side torque, and which is the torque that may be applied to steering wheel 141 by driver 190. One or both steering wheel actuator torque 166 and driver torque 149 may be measured using steering wheel torque sensor 147 as, e.g., is schematically shown in FIG. 4B. In some examples, steering wheel actuator torque 166 may be monitored, e.g., based on the current drawn by steering wheel actuator 144. Furthermore, the output from steering wheel position sensor 146 may be used to determine if steering wheel 141 is rotating. For example, steering wheel 141 continues to rotate when steering wheel actuator torque 166 is applied indicates that steering wheel absolute limiter 142 has not been reached.

If driver torque 149 exceeds the driver-torque threshold (decision block 424, "NO" arrow), method 400 may proceed with warning (block 468) driver 190 to remove obstacles from steering wheel 141. Alternatively, steering wheel 141 is rotated until steering wheel actuator torque 166 reaches the actuator-torque (decision block 426, "NO" arrow), at which point method 400 proceed with registering (block 430) first temporary steering wheel position 491. First temporary steering wheel position 491 is a steering wheel position at which, during the calibration process, steering wheel actuator torque 166 reaches or exceeds actuator-side torque threshold 167. It should be noted that first temporary steering wheel position 491 may correspond to one of absolute steering wheel limits 122 or some intermediate obstruction point. At this stage of method 400, Steering wheel controller 112 is not able to distinguish between this absolute steering wheel limit and the potential obstruction point. As such, first temporary steering wheel position 491 cannot yet be assigned as steering wheel position 120.

Figure 4C:
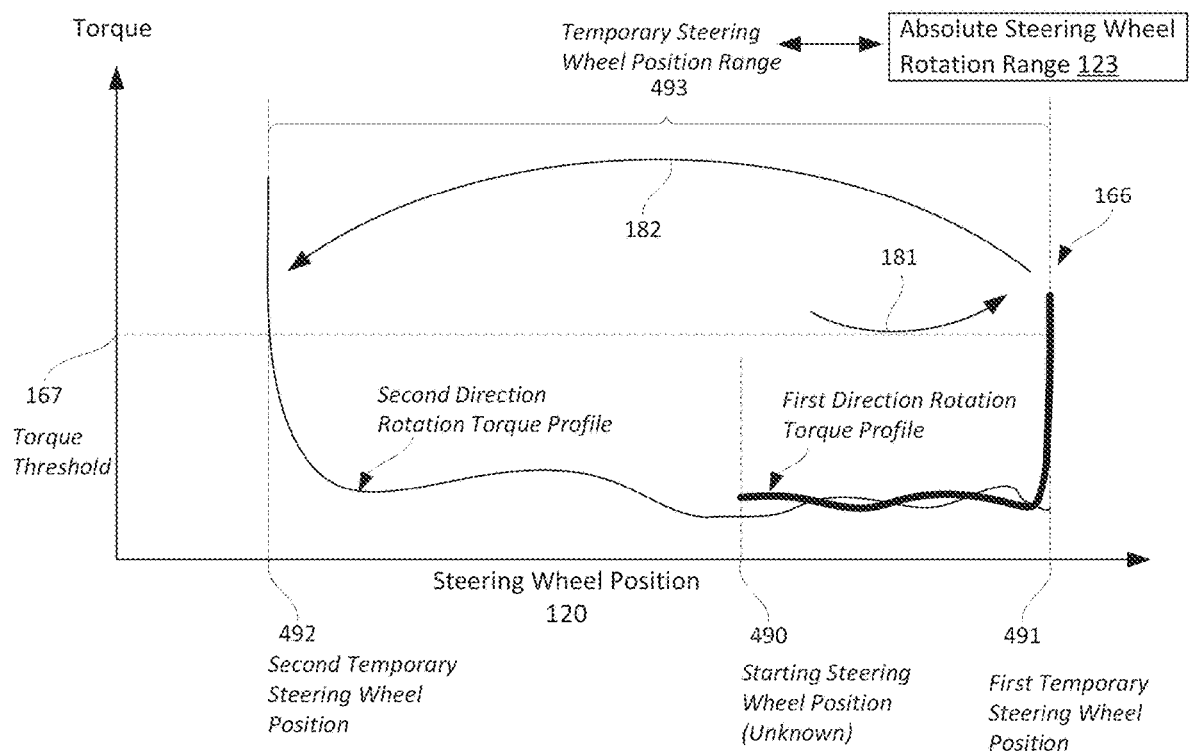
FIG. 4C is a torque plot as a function of the steering wheel position, used in the method of determining a steering wheel position, in accordance with some examples.

Method 400 proceeds with rotating (block 440 in FIG. 4A) steering wheel 141 in second direction 182, opposite to first direction 181. This rotation is also performed while monitoring steering wheel actuator torque 166 and driver torque 149. Similar to the rotation in first direction 181, while rotating in second direction 182, method 400 involves checking actuator torque 166 against the actuator-torque threshold (decision block 444) and also checking driver torque 149 against the deriver-torque threshold (decision block 446). If driver torque 149 exceeds the driver-torque threshold (decision block 444, "NO" arrow), method 400 may proceed with warning (block 468) driver 190 to remove obstacles from steering wheel 141. Alternatively, steering wheel 141 is rotated (now in second direction 182) until steering wheel actuator torque 166 reaches the actuator-torque (decision block 426, "NO" arrow), at which point method 400 proceed with registering (block 440) second temporary steering wheel position 492. Second temporary steering wheel position 492 is point (e.g., the output of steering wheel position sensor 146), at which steering wheel actuator torque 166 reaches or exceeds actuator-side torque threshold 167 while rotating steering wheel 141 in second direction 182 as, for example, is schematically shown in FIG. 4C. Similar to first temporary steering wheel position 491, second temporary steering wheel position 492 may correspond to absolute steering wheel limits 122 or at some intermediate obstruction point. Again, at this stage of method 400, Steering wheel controller 112 may not be able to distinguish between this absolute limit and the potential obstruction point.

Method 400 proceeds with determining (block 460 in FIG. 4A) temporary steering wheel position range 493 between first temporary steering wheel position 491 and second temporary steering wheel position 492.

Method 400 then proceeds with comparing (decision block 462 in FIG. 4A) this temporary steering wheel position range 493 to absolute steering wheel rotation range 123. Absolute steering wheel rotation range 123 corresponds to the entire rotation range of steering wheel 141 between steering wheel absolute position limiters 142. When temporary steering wheel position range 493 is within a calibrated thresholds (e.g., 5% or 10%) of absolute steering wheel rotation range 123, then first temporary steering wheel position 491 and second temporary steering wheel position 492 are identified as absolute steering wheel limits 122. In this case, method 400 proceeds with assigning (block 464 in FIG. 4A) second temporary steering wheel position 492 as steering wheel position 120. This operation will be described in more detail. For example, an offset is computed based on second temporary wheel position 492, stored in the memory, and applied to steering wheel position sensor input 126 to obtain steering wheel position 120

As noted above, steering wheel position 120 is a combination of steering wheel position sensor input 126 and steering wheel calibrated reference 125. In the above example, second temporary steering wheel position 492 represents steering wheel position sensor input 126 when steering wheel 141 is at one of steering wheel absolute position limiters 142. However, steering wheel controller 112 stores the information, representing steering wheel position 120 at each of steering wheel absolute position limiters 142. Steering wheel controller 112 uses this information to calculate an offset between second temporary steering wheel position 492 and steering wheel position 120 and determine steering wheel calibrated reference 125.

Furthermore, based on the now determined steering wheel position 120, method 400 proceeds with rotating (block 466) steering wheel 141 until steering wheel position 120 matches steering rack position 130. For example, steering wheel position 120, corresponding to steering rack position 130, may be determined inversely using steering map 170 as further described below. It should be noted that, in some examples, steering rack position 130 does not change during various operations of method 400. In other words, mechanical aspects of method 400 are performed by steering wheel assembly 140. In some examples, method 400 also comprises sending (block 467 in FIG. 4A) a calibration completion update to vehicle network 105. This calibration completion update may be used, for example, to end the vehicle's immobilization.

Alternatively, when temporary steering wheel position range 493 is less than absolute steering wheel rotation range 123, then at least one of absolute steering wheel limits 122 was not reached during the previous rotation operations. As such, it is not possible to conclude that the current position of steering wheel 141, e.g., second temporary steering wheel position 492, is at the one absolute steering wheel limits 122. In this case, method 400 may proceed with sending (block 468 in FIG. 4A) a warning to driver 190, e.g., to remove potential obstacles from steering wheel 141. Thereafter, method 400 reverts back to sending (block 414) a new steering system calibration request to vehicle network 105, and various operations, described above, are repeated. In some examples, method 400 involves waiting for a predetermined period or a confirmation from the driver, before repeating these operations.

FIG. 4C is a plot of steering wheel actuator torque 166 applied to steering wheel 141, by steering wheel actuator 144, as a function of steering wheel position 120. Starting steering wheel position 490, which is unknown, is presented as a reference. Steering wheel actuator torque 166 may vary while steering wheel 141 is rotated due to various resistances (e.g. inertias, frictions, external resistances) to this rotation (e.g., internal and/or external steer-by-wire system 110). At some point, corresponding to first temporary steering wheel position 491, steering wheel actuator torque 166 reaches or exceeds actuator-side torque threshold 167. For example, when steering wheel 141 reaches one of absolute steering wheel limits 122 or is obstructed along the way by other means without reaching this limit, steering wheel actuator torque 166 spikes as the controller is trying to further rotate the steering wheel 141 which cannot be further rotated. In some examples, the threshold for steering wheel actuator torque 166 is tunable, e.g., based on the ambient temperature. For example, the friction within steering wheel assembly 140 may increase at colder temperatures and a higher threshold may be needed as a result.

Examples of Operating with Undetermined Steering Wheel Position (Absolute Angle)

In some examples, steer-by-wire system 110 is configured to support the overall vehicle operation at rare and unintended operating conditions, For example, a power interruption to one or more components of steer-by-wire system 110 may occur or vehicle 100 is incorrectly activated/immobilized while steer-by-wire system 110 has not yet completed the calibration process. In these rare operating conditions, steering wheel position 120 or, more specifically, steering wheel calibrated reference 125 may not be available even if vehicle 100 is not fully immobilized. For purposes of this disclosure, immobilization may be referred to as a vehicle state at which vehicle 100 is not in motion and cannot start moving. It should be noted that steering wheel position sensor 146 may remain operational and provide steering wheel position sensor input 126. However, this steering wheel position sensor input 126 may not be used to produce steering wheel position 120 since steering wheel calibrated reference 125 is not available.

When vehicle 100 is not immobilized, a process of determining steering wheel position 120, which is described above with reference to method 400 cannot be used. Specifically, uninterrupted steering input from driver 190 may be needed when vehicle 100 is not stationary as conditions around vehicle 100 can change. In these examples, steer-by-wire system 110 is operated in a special steering mode, which may also cause the entire vehicle 100 to operate in a limp mode. This special steering mode allows driver 190 to continue providing the steering input and to operate vehicle 100, e.g., to bring vehicle 100 to a stop. When vehicle 100 is immobilized, steering wheel position 120 may be reestablished in accordance with method 400 described above.

Figure 5A:
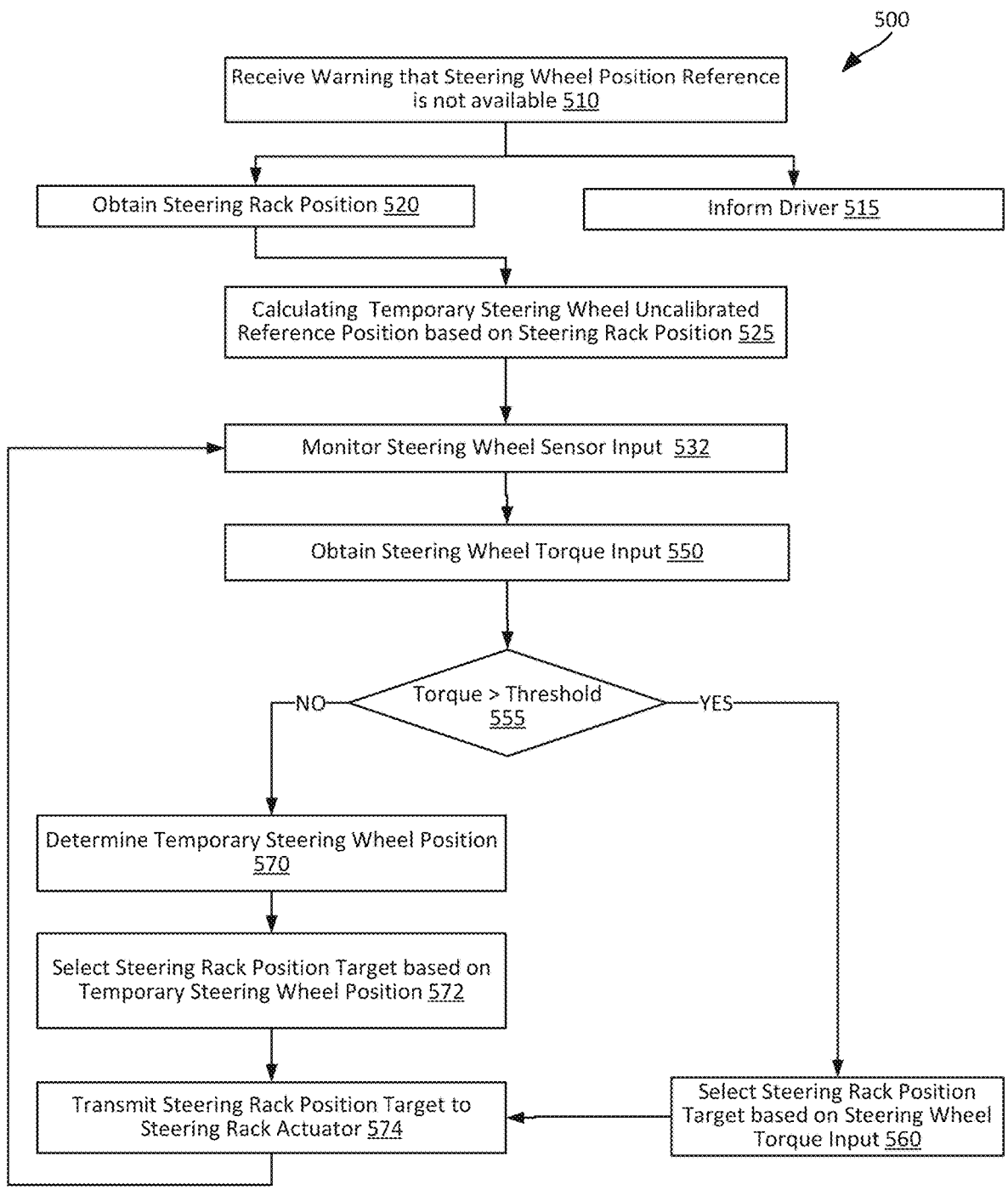
FIG. 5A is a process flowchart corresponding to a method of operating a vehicle without a steering wheel position reference, in accordance with some examples.

FIG. 5A is a process flowchart corresponding to method 500 of operating steer-by-wire system 110 in this special uncalibrated mode, in accordance with some examples. Method 500 may commence with steering wheel controller 112 receiving (block 510) a warning that steering wheel position 120 is not available. This warning may be generated internally within steering wheel controller 112, e.g., based on the fact that steering wheel calibrated reference 125 is not available. As noted above, this and other operations of method 500 may be performed while vehicle 100 is in motion. This receiving operation (in combination with the vehicle speed input) triggers the special uncalibrated mode of steer-by-wire system 110. In some examples, method 500 proceeds with informing (block 515) driver 190 about the special uncalibrated mode, e.g., by providing visual and/or sound indications and, in some example, to switch the entire vehicle 100 into a limp mode, e.g., limiting the driving speed, duration, and other operating conditions.

Method 500 proceeds with steering wheel controller 112 obtaining (block 520) steering rack position 130. For example, steering rack position 130 is obtained by rack position sensor 156 and first transmitted to rack controller 116, which then transmits steering rack position 130 to steering wheel controller 112. It should be noted that steering rack position 130 represents the current position of steering rack 151.

Figures 5B, 5C:
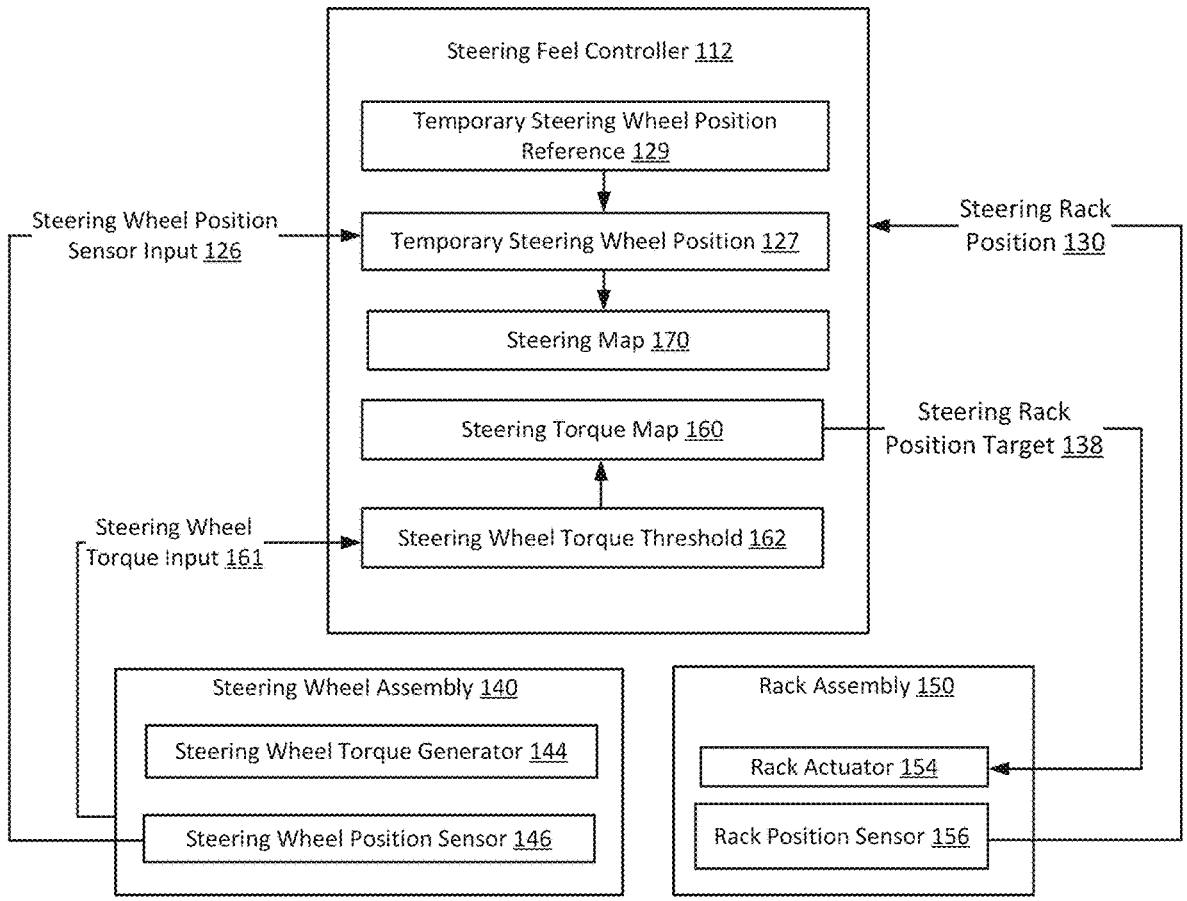
FIG. 5B is a block diagram illustration of various data transfers in the steer-by-wire system while operating the vehicle without the steering wheel position reference, in accordance with some examples.
FIG. 5C is one example of a steering input torque-based alignment map.

Method 500 then proceeds with steering wheel controller 112 calculating (block 525) temporary steering wheel uncalibrated reference 129, based on current steering rack position 130 as, e.g., is schematically shown in FIG. 5B. Temporary steering wheel uncalibrated reference 129 may be also referred to as a temporary current absolute steering wheel angle or, simply, as a temporary absolute angle. For example, steering wheel controller 112 uses steering map 170, inversely, to calculate steering wheel temporary uncalibrated reference 129 from steering rack position 130 (and, in some examples, the current speed of vehicle 100). It should be noted that steering map 170 is intended to determine one of steering rack position values 173 based on steering wheel position 120. In this special uncalibrated mode, steering maps 170 is used differently, effective in an inverse way. This temporary steering wheel uncalibrated reference 129 is later used for determining temporary steering wheel position 127 based on steering wheel position sensor input 126. It should be noted that temporary steering wheel uncalibrated reference 129 may be different from steering wheel calibrated reference 125, which may be also referred to as a calibrated steering wheel position reference.

Method 500 proceeds with steering wheel controller 112 monitoring (block 532) steering wheel position sensor input 126 as, e.g., is schematically shown in FIG. 5B. Steering wheel position sensor input 126 is continuously provided by steering wheel position sensor 146. Furthermore, method 500 involves obtaining (block 550) the steering wheel torque input. The implication may be that driver 190 is trying to turn steering wheel 141 but steering wheel 141 is in contact with one of steering wheel absolute position limiters 142. In this scenario, due to the misalignment between steering wheel and steering rack, the steering rack may be able to move further in the direction of applied steering wheel torque as long as torque is applied, until rack limits are reached per steering map 170. It should be noted that the temporary steering wheel position may not be the same as an actual/true steering position and Steering wheel controller 112 may not know whether steering wheel absolute position limiters 142 have been reached.

Referring to FIG. 5A, steering wheel torque 161 is then compared (decision block 555) to steering wheel torque threshold 162. When steering wheel torque 161 is greater than steering wheel torque threshold 162 (decision block 555), method 500 proceeds with selecting (block 560) a steering rack adjustment rate target, based on steering wheel torque 161. In this situation, driver 190 is trying to turn steering wheel 141 but steering wheel 141 is in contact with one of steering wheel absolute position limiters 142 and cannot be further turned, resulting in steering wheel torque 161 being greater than steering wheel torque threshold 162. For example, steer-by-wire system 110 may comprise steering wheel torque map 160, one example of which is shown in FIG. 5C. Steering wheel torque map 160 comprises a set of steering wheel torque values, which are used to compare steering wheel torque 161. Furthermore, steering wheel torque map 160 comprises a steering rack adjustment rate value for each of the steering wheel torque values, e.g., 60 mm/sec for a steering wheel torque of 10 N-m. In this example of steering wheel torque map 160, steering wheel torque threshold 162 is 0.5 N-m, i.e., steering rack 151 is not adjusted when steering wheel torque values are below 0.5 N-m. Furthermore, in this example, steering rack adjustment values are expressed as an adjustment speed (e.g., 60 mm/sec). Other examples are within the scope (e.g., a level of adjustment).

Alternatively, when steering wheel torque 161 is less than steering wheel torque threshold 162 (decision block 555), method 500 proceeds determining (block 570) temporary steering wheel position 127 from temporary steering wheel uncalibrated reference 129 and steering wheel position sensor input 126. This operation is similar to obtaining steering wheel position 120 from steering wheel calibrated reference 125 and steering wheel position sensor input 126. Method 500 also proceeds with selecting (block 572) steering rack position target 138 based on temporary steering wheel position 127 and transmitting (block 574) steering rack position target 138 to rack actuator 154. Specifically, steering rack position target 138 is selected using steering map 170.

In some examples, method 500 involves updating temporary steering wheel uncalibrated reference 129 based on steering rack position target 138 obtained based on steering wheel torque 161. For example, when steering rack 151 is allowed to move while steering wheel 141 does not rotate, the temporary reference changes. This process may be referred to as intermediate calibration.

Method 500 repeats in cycles as shown in FIG. 5A and vehicle 100 remains in a special mode (e.g., in a limp mode with a limited speed and/or travel distance). Steering wheel controller 112 continues determining temporary steering wheel position 127 and steering rack position target 138 and receiving steering wheel torque 161, as feedback. As noted above, Steering wheel controller 112 may use this information to perform the intermediate calibration, thereby getting temporary steering wheel uncalibrated reference 129 closer to the actual steering wheel position reference.

Examples of Driver Feedback and Maintaining Steering Wheel-to-Rack Alignment

As noted above, steering rack position 130 is changed using rack actuator 154, e.g., based on steering rack position target 138 received from steering wheel controller 112. Rack actuator 154 has a maximum rate with which steering rack position 130 can be changed for a given rack force. This rate may be referred to as a maximum rack movement speed. The maximum rack movement speed depends on the power of rack actuator 154 and the resistive force operable on steering rack 151. Furthermore, as noted above, steering map 170 defines the relationship between steering rack position 130 and steering wheel position 120 or, more specifically, between steering rack position values 173 and steering wheel position values 172. As such, the maximum rack movement speed has a corresponding steering wheel turning speed, which may be referred to as a maximum allowable steering wheel rotation. If driver 190 turns steering wheel 141 faster than the maximum allowable steering wheel rotation, then rack actuator 154 may not able to change steering rack position 130 fast enough, resulting in the misalignment of steering rack position 130 and steering wheel position 120. In other words, in this example, steering rack position 130 lags behind steering wheel position 120. This phenomenon is also referred to as catch-up.

Figure 6A:
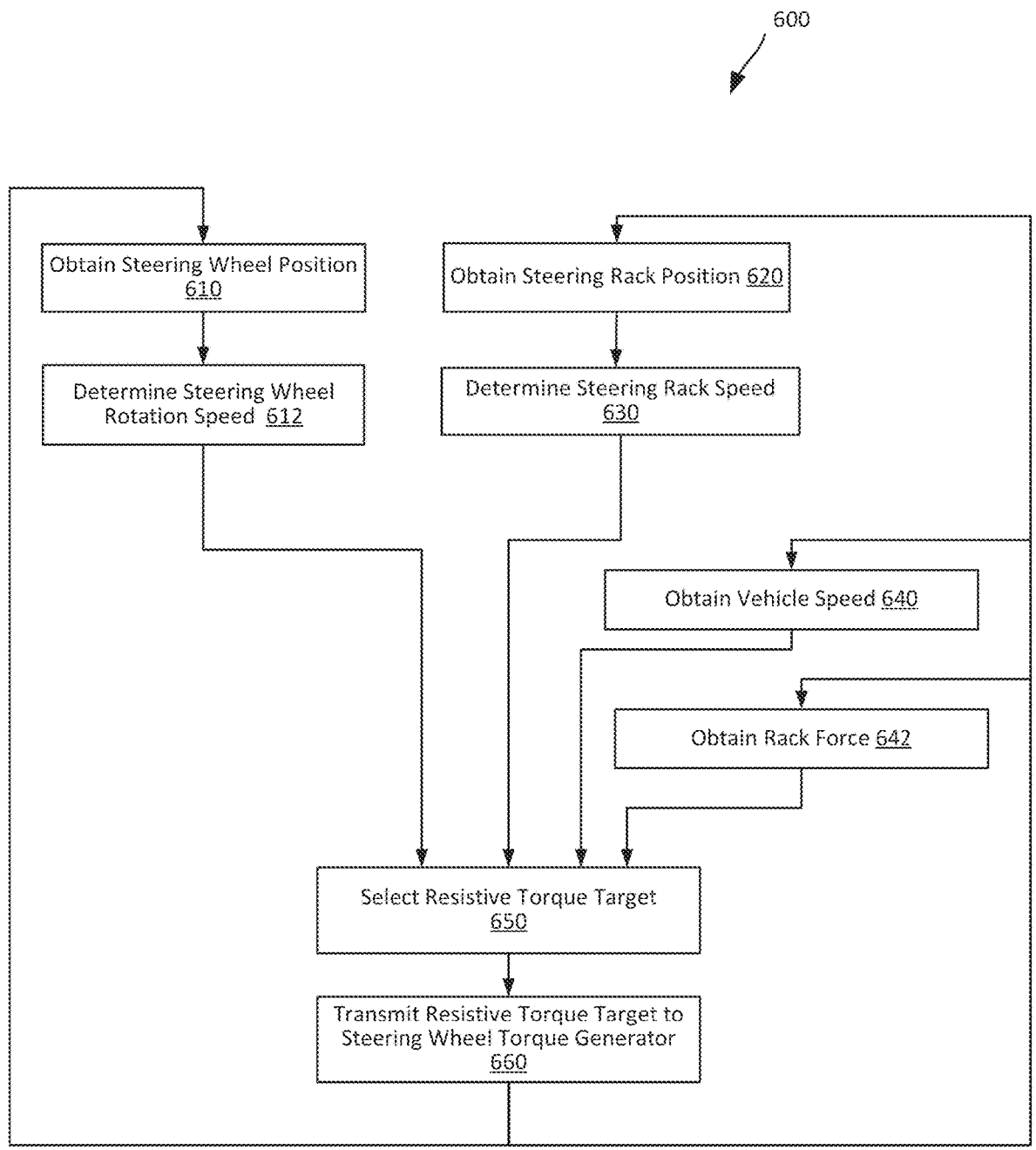
FIG. 6A is a process flowchart corresponding to a method of providing resistive torque feedback to the steering wheel for various operating conditions, in accordance with some examples.
Figures 6B, 6C:
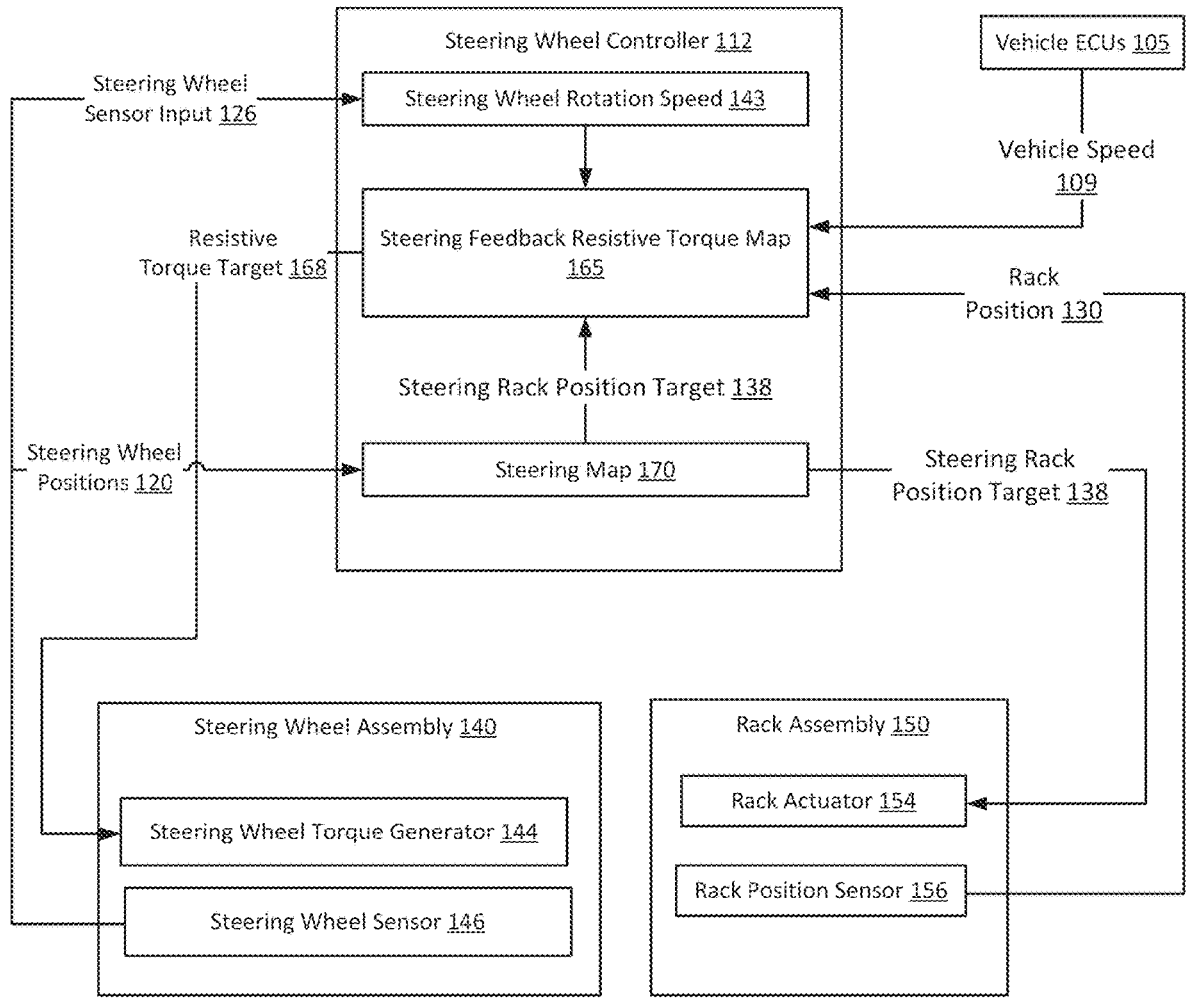
FIG. 6B is a block diagram illustration of various data transfers in the steer-by-wire system while providing resistive torque feedback to the steering wheel for various operating conditions, in accordance with some examples.
FIG. 6C is one example of a steering feedback resistive torque map.

FIG. 6A is a process flowchart corresponding to method 600 of providing driver feedback and maintaining the steering wheel-to-rack alignment, in accordance with some examples. Method 600 comprises obtaining (block 610) steering wheel position 120. For example, Steering wheel controller 112 periodically receives steering wheel position sensor input 126 from steering wheel position sensor 146 as, e.g., is schematically shown in FIG. 6B.

Method 600 proceeds with determining (block 612) steering wheel rotation speed 143 based on changes in steering wheel positions 120. In some examples, steering wheel rotation speed 143 is determined directly from multiple steering wheel position sensor input 126, e.g., without first determining steering wheel positions 120. In some examples, method 600 also involves calculating steering rack position target 138 based on steering wheel positions 120, e.g., using steering map 170. Steering rack position target 138 may be used later to determine the alignment between steering wheel 141 and steering rack 151, e.g., by comparing steering rack position target 138 to steering rack position 130.

Method 600 then proceeds with obtaining (block 620) steering rack position 130 from rack position sensor 156. Method 600 also involves determining (block 630) the steering rack speed from changes in steering rack position 130.

In some examples, method 600 comprises obtaining (block 640) vehicle speed 109 and/or obtaining (block 642) the rack force. The rack force is applied by rack actuator 154 and may be, e.g., measured by rack force sensor 157 or estimated from the current flowing to rack actuator 154.

Method 600 proceeds with selecting (block 650) resistive torque target 168 based on steering wheel rotation speed 143 and/or other parameters presented in steering feedback resistive torque map 165, one example of which is shown in FIG. 6C. Resistive torque target 168 is used by steering wheel actuator 144 to apply a resistive torque to steering wheel 141. This resistive torque is added to other "driver-feel" torque input from various other steering feel-features of steer-by-wire system 110. Resistive torque target 168 determines the additional torque that driver 190 will experience when driver 190 tries to turn steering wheel 141.

Other factors include steering wheel speed, rack speed, rack force, and vehicle speed. Steering feedback resistive torque map 165 comprises steering wheel rotation speed values, to which steering wheel rotation speed 143 is compared. Furthermore, steering feedback resistive torque map 165 comprises resistive torque target values, corresponding to different steering wheel rotation speed values. In some examples, steering feedback resistive torque map 165 comprises other values, such as rack position difference values and vehicle speed values, which are further described below.

During the design/calibration phase, the power characteristics of rack actuator 154 are known. The rack force is also continuously measured (e.g., using rack force sensor 157) or calculated (e.g., from the current flow to rack actuator 154). Therefore, the resistive torque target values in steering feedback resistive torque map 165 may be specifically tuned to prevent catch-up using the rack force. For example, higher resistive torque target values may be used for resisting driver's efforts, characterized by steering wheel rotation speed/rate. In some examples, the steering wheel rotation speed, attempted by driver 190, may be greater than the capabilities of rack actuator 154 to move steering rack 151, in which case higher resistive torque target values are selected from steering feedback resistive torque map 165.

In some examples, resistive torque target 168 is selected using steering feedback resistive torque map 165 and based on the rack force, the steering wheel rotation speed, the vehicle speed, and the rack speed. For example, steering feedback resistive torque map 165 comprises the rack force and the rack speed, corresponding to the steering wheel speed and the vehicle speed, which may result in a target resistive torque value, e.g., tuned to prevent catch-up.

Method 600 proceeds with transmitting (block 660) resistive torque target 168 to steering wheel actuator 144. In turn, steering wheel actuator 144 uses resistive torque target 168 to control the torque, which driver 190 experiences as driver 190 tries to turn steering wheel 141.

Examples of Steering Wheel-to-Rack Alignment

In some examples, various issues may occur with the alignment between steering wheel 141 and steering rack 151. For example, steering wheel 141 may be rotated while vehicle 100 is switched off with the respective controllers not registering this rotation. The realignment process depends, at least in part, on the immobilization status of vehicle 100. Specifically, when vehicle 100 is moving (e.g., vehicle speed 109 is not equal to zero), the alignment needs to occur as soon as possible. On the other hand, when vehicle 100 is stationary (e.g., vehicle speed 109 is at or close to zero), moving steering rack 151 and, as a result, turning road wheels 191 (without any input from or awareness of driver 190) in the stationary vehicle may cause unintended consequences (e.g., contacting with an object proximate to road wheel 191). Overall, moving steering rack 151 and, as a result, road wheels 191 should be avoided without driver control and intent while vehicle 100 is stationary. In some examples, steer-by-wire system 110 is configured to perform different alignment operations depending on vehicle speed 109 as will now be described with reference to FIGS. 7A and 7B.

Figure 7A:
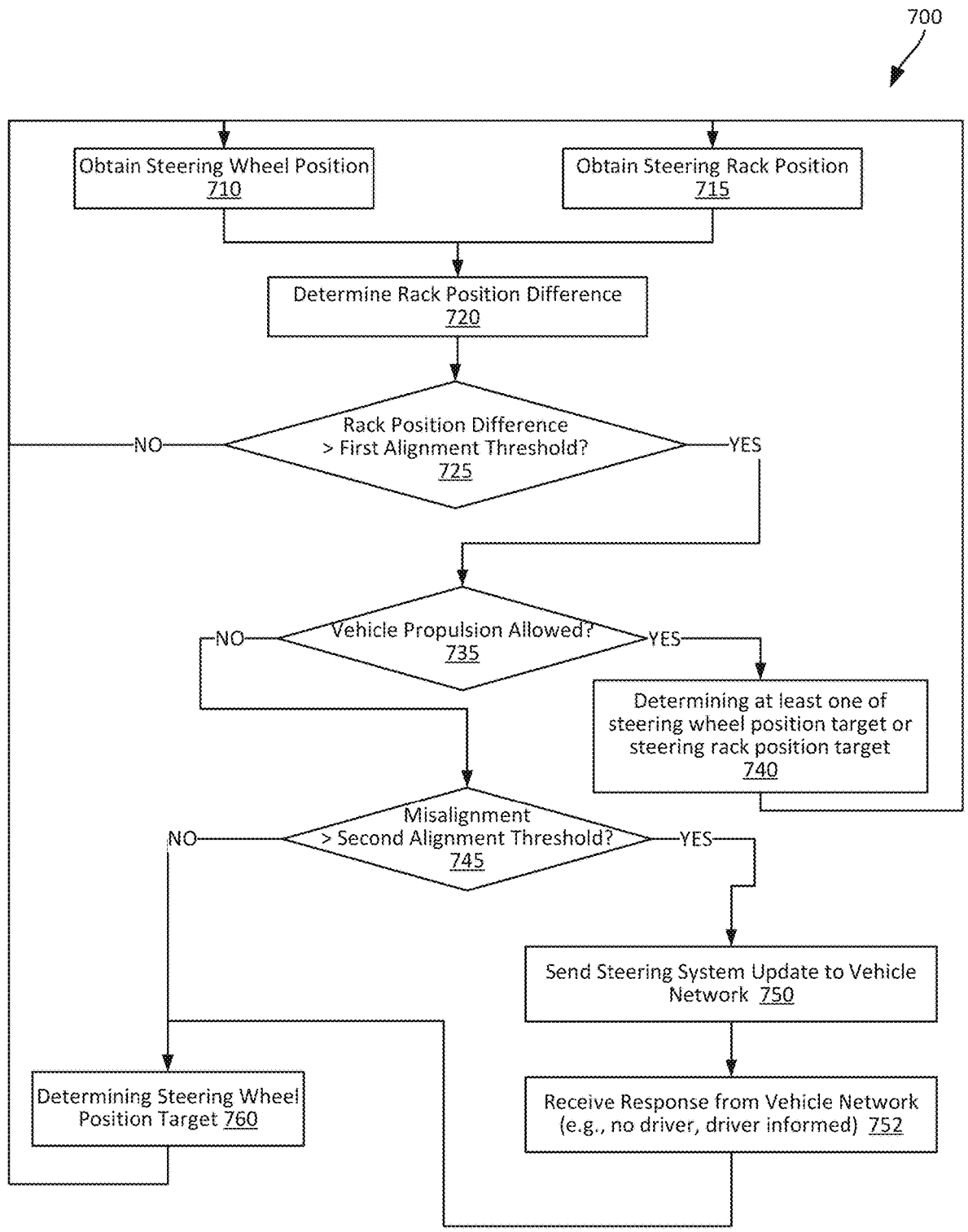
FIG. 7A is a process flowchart corresponding to a method of maintaining the steering wheel-to-rack alignment at various operating conditions of the vehicle, in accordance with some examples.
Figures 7B, 7C:
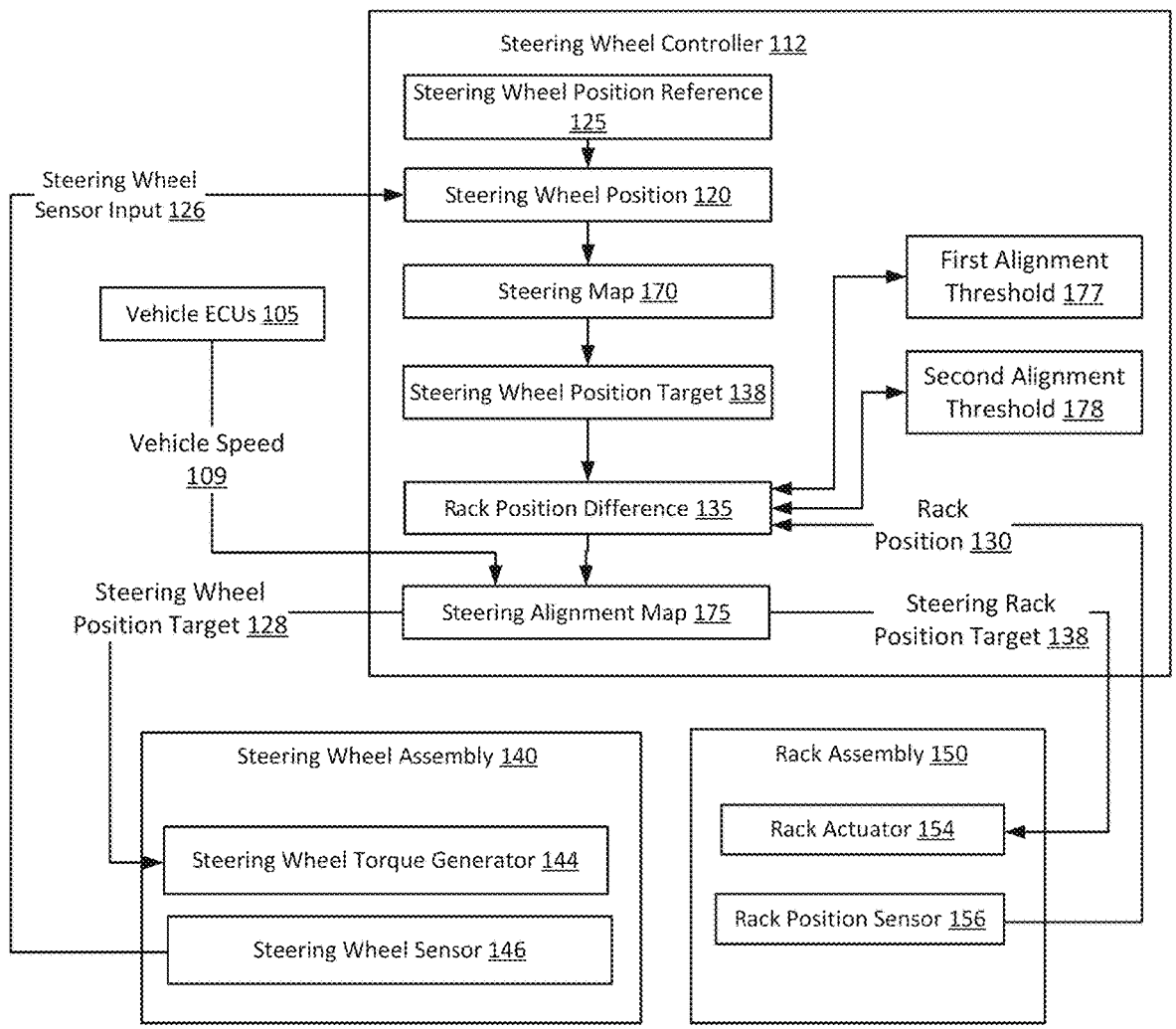
FIG. 7B is a block diagram illustration of various data transfers in the steer-by-wire system while maintaining the steering wheel-to-rack alignment at various operating conditions of the vehicle, in accordance with some examples.
FIG. 7C is an example of a steering re-alignment map.

FIG. 7A is a process flowchart corresponding to method 700 of maintaining the alignment between steering wheel 141 and steering rack 151 in steer-by-wire system 110, in accordance with some examples. Method 700 may commence with steering wheel controller 112 obtaining (block 710) steering wheel position 120 (e.g., based on steering wheel position sensor input 126 from steering wheel position sensor 146) and also obtaining (block 715) steering rack position 130 (e.g., from rack position sensor 156 through rack controller 116). These two operations are performed periodically (e.g., in 1-10 milliseconds periods). FIG. 7B is a block diagram illustrating various data (e.g., steering wheel position sensor input 126 and steering rack position 130) transferred between different components of steer-by-wire system 110.

Method 700 proceeds with determining (block 720) rack position difference 135 based on steering wheel position 120 and steering rack position 130. For example, steering wheel position 120 may be used together with steering map 170 to determine steering wheel position target 128. The difference between steering wheel position target 128 and steering rack position 130 may be used as rack position difference 135, which indicates the alignment level in steer-by-wire system 110.

Method 700 proceeds with comparing (decision block 725) rack position difference 135 with one or more thresholds, such as first alignment threshold 177. For example, when rack position difference 135 (decision block 725) is greater than first alignment threshold 177, then the alignment may be needed. Method 700 may also involve checking (decision block 735) if the vehicle propulsion is allowed (e.g., vehicle 100 may be already moving or may be authorized to move by vehicle network 105). In this situation, the vehicle will enter limp mode however a quick alignment may still need to be performed. Specifically, when the vehicle propulsion is allowed (decision block 725), method 700 proceeds with determining (block 740) at least one of steering wheel position target 128 and/or steering rack position target 138 calculated in such a way as to realign steering wheel and rack position as quickly as possible. This determination operation is performed based on rack position difference 135. For example, steering alignment map 175 may be used in this operation. One example of steering alignment map 175 is presented in FIG. 7C. Steering alignment map 175 comprises rack position difference values, steering wheel position change values, and steering rack position change values. Each set (represented by a row) of the steering wheel position change values and the steering rack position change values is selected (e.g., computed by interpolating) based on the corresponding one of the rack position difference values, e.g., by comparing this rack position difference value to rack position difference 135. In general, higher rack position difference values correspond to higher steering wheel position change values and also to higher steering rack position change values. In some examples, steering alignment map 175 also comprises vehicle speed value, steering angle difference values, propulsion state (e.g., allowed/inhibited). For example, more responsive alignment may be needed at higher speeds.

Method 700 then returns to the previous operations of obtaining (block 710) steering wheel position 120 and obtaining (block 715) steering rack position 130.

When the vehicle propulsion is not allowed (decision block 735), method 700 proceeds with rack position difference 135 (decision block 745) is greater than second alignment threshold 178. Second alignment threshold 178 is greater than first alignment threshold 177. The purpose of first alignment threshold 177 is to determine if the alignment is necessary at all. The purpose of second alignment threshold 178 is to determine if the alignment level is such that driver 190 and, in some examples, vehicle network 105 need to be informed. Specifically, when rack position difference 135 (decision block 745) is less than second alignment threshold 178, method 700 proceed with determining (block 760) steering wheel position target 128. It should be noted that steering rack position target 138 is not determined when the vehicle propulsion is not allowed and the alignment is performed only by rotating steering wheel 141 (and not moving steering rack 151). Steering wheel position target 128 is determined based on rack position difference 135 and, for example, using steering alignment map 175.

When rack position difference 135 (decision block 745) is greater than second alignment threshold 178, method 700 proceed with sending (block 750) a steering system update (e.g., a system calibration request) to vehicle network 105 and receiving (block 752) a response from vehicle network 105 before proceeding with determining (block 760) steering wheel position target 128.

Examples of Controlling Steering Wheel During Driver's Ingress and Egress

In some examples, steering wheel 141 does not include a mechanical lock ("M-lock") or an electronic steering lock ("E-lock"), e.g., for reasons such as packaging, costs, and the like. At the same time, drivers 190 often use steering wheel 141 as support during the vehicle ingress or egress. In a conventional steering system, where the mechanical lock is provided or where the steering wheel is mechanically coupled to the road wheels, the movement of the steering wheel is restricted by this lock or the road wheels. For example, the road wheels are difficult to move while the vehicle is stationary if the system is unpowered.

Figure 8A:
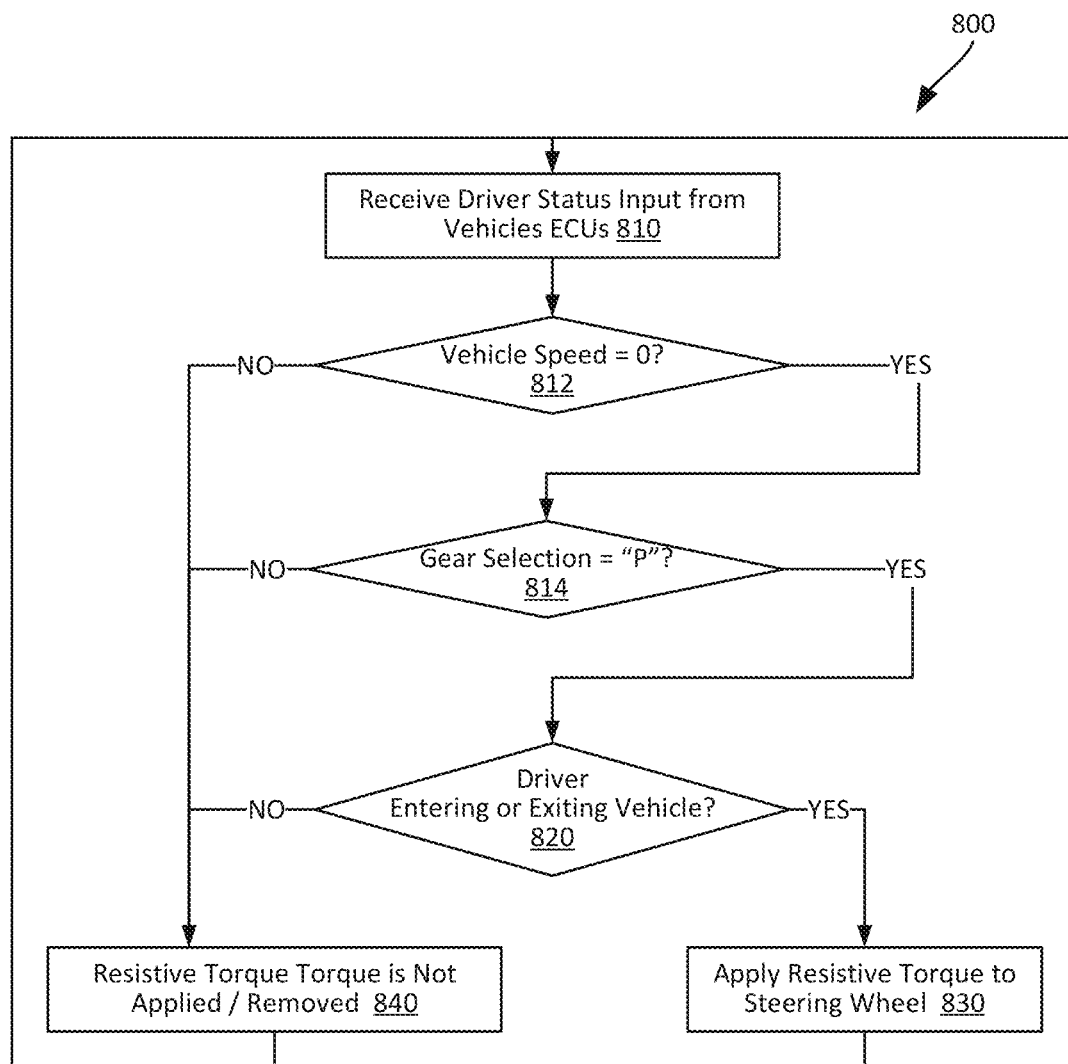
FIG. 8A is a process flowchart corresponding to a method of controlling a resistive torque applied to the steering wheel when the driver enters or exits the vehicle, in accordance with some examples.

FIG. 8A is a process flowchart corresponding to method 800 of controlling the rotation of steering wheel 141 while driver 190 enters (ingresses) or leaves (egresses) vehicle 100, in accordance with some examples without a need for a mechanical lock or a linkage between steering wheel 141 and road wheels 191. Specifically, steering wheel actuator 144 is used to apply resistive torque 164 to inhibit or to minimize the rotation of steering wheel 141 by driver 190. In some examples, the value of resistive torque 164 is adjustable too, e.g., up to 25 N-m for different vehicle types, steering wheels, and drivers. These torque values are generally sufficient to overcome the rotation of steering wheel 141 by driver 190, e.g., with average strength and effort. The condition, at which resistive torque 164 is applied, may be referred to as a soft-lock of steering wheel 141.

Method 800 commences with receiving (block 810) driver status input 194 from one or more vehicle network 105. Driver status input 194 may include various information, such as (1) driver 190 entering vehicle 100; (2) driver 190 inside vehicle 100; (3) driver 190 exiting vehicle 100; (4) driver 190 outside vehicle 100; and (5) driver's state unknown. Vehicle network 105 generates driver status input 194 based on feedback from various sensors and systems in vehicle 100. For example, sensing the wireless key outside vehicle 100 may be an indication that driver 190 is planning to enter vehicle 100. A seat sensor may indicate that driver 190 is inside vehicle 100. When driver 190 is inside vehicle 100 and also when vehicle 100 is being turned off may be used to determine that driver 190 is planning to leave vehicle 100. Overall, vehicle network 105 collect various information from vehicle 100 (e.g., door status, seatbelt status, steering hands-on/hands-off detection, actuation of any controls (e.g., gear, pedals, switches), seat sensors, interior and/or exterior camera, wireless access car detection, phone Bluetooth connection, and the like) and uses this information to determine driver status input 194, which is supplied to steering wheel controller 112 as schematically shown in FIG. 8B.

In some examples, one or more parameters are separately analyzed by steering wheel controller 112. For example, method 800 may comprise verifying (decision block 812) the vehicle speed. If the speed is not zero (and vehicle 100 is in motion), method 800 is not performed. Similarly, method 800 may comprise verifying (decision block 814) the gear selection. If the gear selection is not "park" (P), method 800 is also not performed.

Returning to FIG. 8A, when driver status input 194 indicates that driver 190 is entering or exiting vehicle 100 or expected to enter or exit vehicle 100 (decision block 820), method 300 proceed with applying (block 830) resistive torque 164 to steering wheel 141. It should be noted that various other conditions may be already satisfied before reaching this decision block (e.g., the speed checking in decision block 812 and/or the gear selection in decision block 814).

Figure 8B:
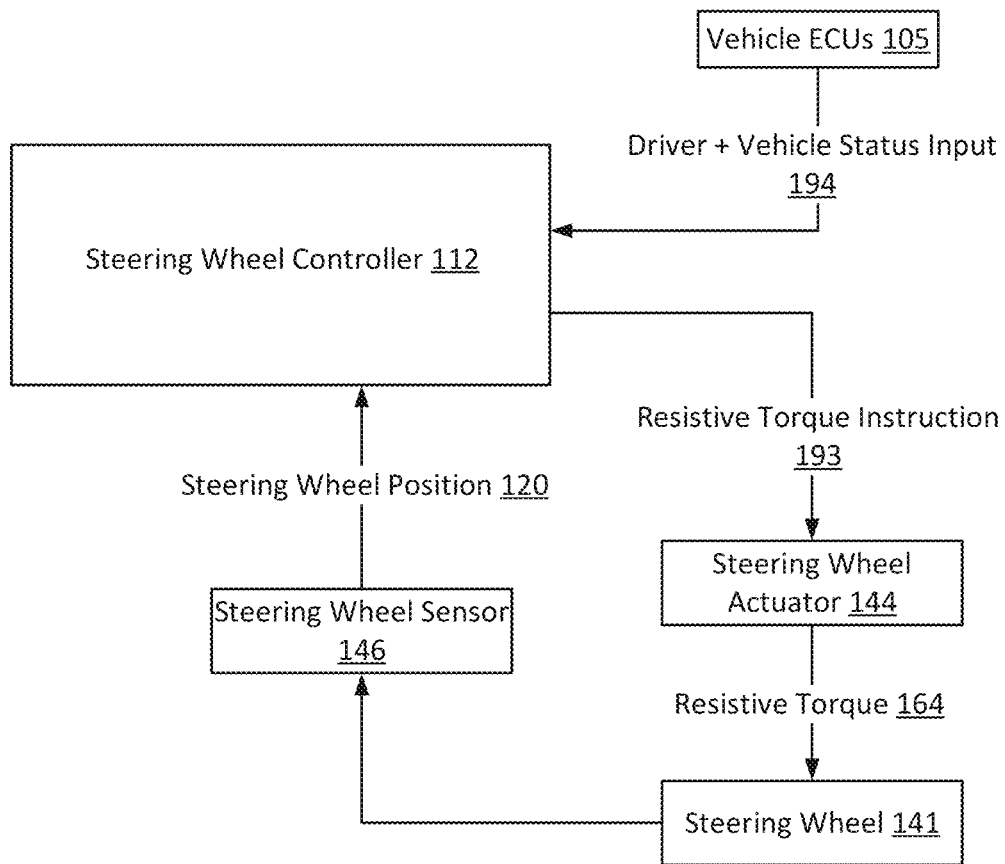
FIG. 8B is a block diagram illustration of various data transfers in the steer-by-wire system while controlling the resistive torque, in accordance with some examples.

More specifically, during this resistive torque applying operation, steering wheel controller 112 sends resistive torque instruction 193 to steering wheel actuator 144 as schematically shown in FIG. 8B. Steering wheel actuator 144 then applies resistive torque 164 to steering wheel 141, in response to this instruction. As noted above, resistive torque 164 is used to counter the torque applied to steering wheel 141 by driver 190 and to prevent steering wheel 141 from rotating by driver 190. As such, driver 190 can use steering wheel 141 for support while entering or exiting vehicle 100.

As soon as driver status input 194 changes (e.g., to other states not corresponding to driver 190 entering or exiting vehicle 100), resistive torque 164 is removed (block 840). The removal of resistive torque 164 allows, for example, to turn steering wheel 141, e.g., during operation of vehicle 100. In some examples, resistive torque 164 is removed gradually (e.g., in case driver 190 rests on steering wheel 141 and still relies on steering wheel 141 for support). This gradual removal of resistive torque 164 prevents the steering wheel from snapping.

It should be noted that the alignment between steering wheel 141 and steering rack 151 is controlled even when resistive torque 164 is applied to steering wheel 141. For example, driver 190 may be able to overcome resistive torque 164 and turn steering wheel 141, in which case steering rack 151 also changed its position to maintain the alignment.

Examples of Reliability Enhancement Measures

Figure 9:
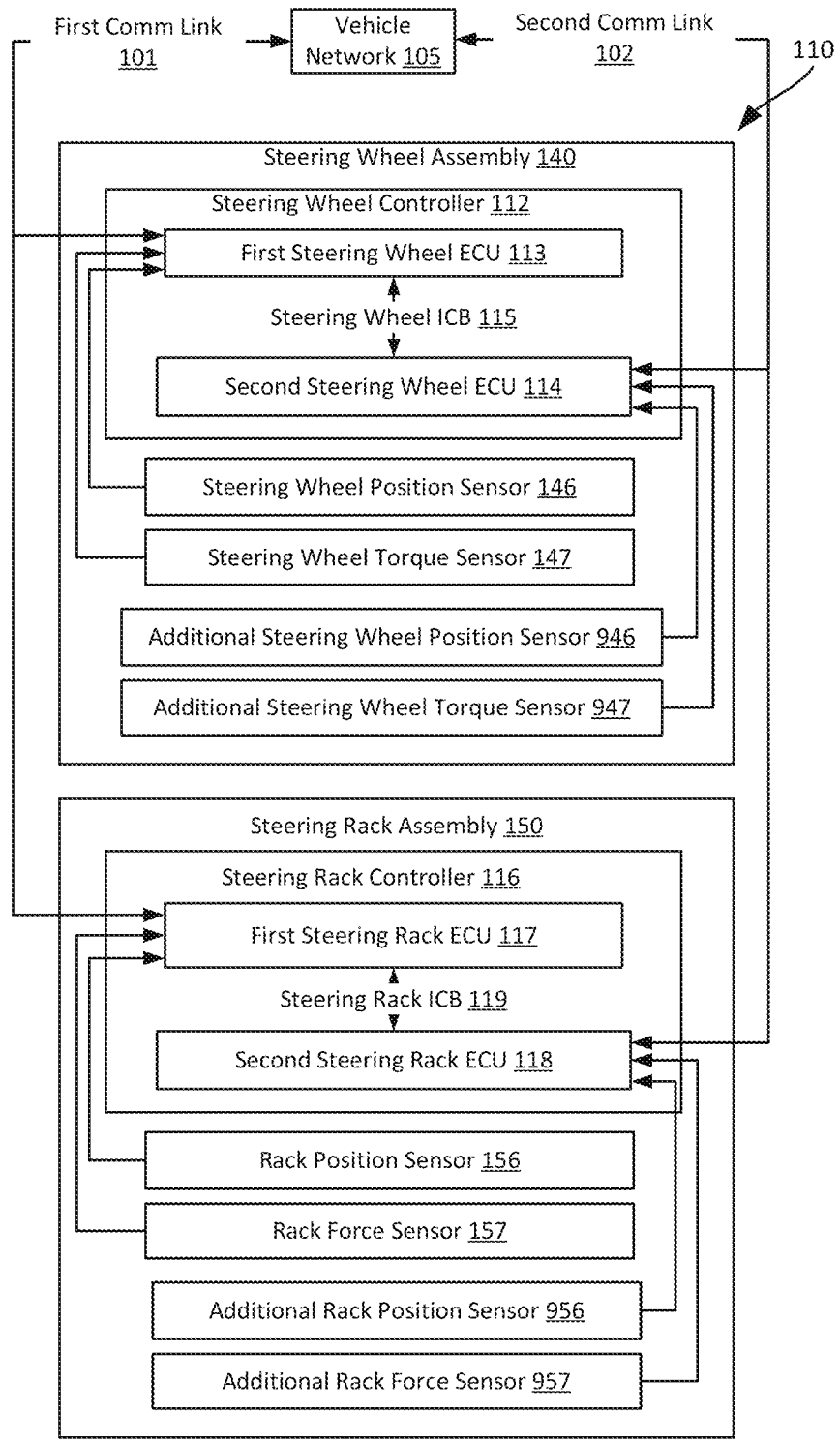
FIG. 9 is a block diagram corresponding to maintaining control redundancies while operating a steer-by-wire system, in accordance with some examples.

Referring to FIG. 1A and FIG. 9, in some examples, steer-by-wire system 110 has built-in control redundancies at both steering wheel controller 112 and rack controller 116. Specifically, each steering wheel controller 112 and rack controller 116 comprises two separate ECUs, independently capable of controlling various other components of steer-by-wire system 110. This ECU redundancy helps to maintain the operation of steer-by-wire system 110 when one or more ECUs become unavailable. Furthermore, multiple communication links (internal and external) are available for communication between ECUs, which may be referred to as communication-link redundancy. In other words, steer-by-wire system 110 can operate on either redundant ECU and/or on either redundant communication link. These ECU and communication-link redundancies are independent. For example, switching from one ECU to another does not require switching the communication link. Similarly, switching from one communication link to another does not require switching ECUs.

In general, switching between communication links and/or ECUs is based on operation criticality, component unavailability, and other factors. The overall approach is to maintain the current ECU even while linking to a different communication link where more reliable data may be available for some sensors or vehicle inputs unless the change in both is unavoidable to maintain the vehicle operation. It should be noted that when an ECU switch is performed, one level of redundancy is lost and may no longer be available for future operations.

For example, a vehicle speed is used for various operations of steer-by-wire system 110, such as steering map lookup, controlling power-up/down, and the like. If the vehicle speed is missing on first communication link 101, steer-by-wire system 110 may obtain the vehicle speed on second communication link 102. This operation is performed without switching to a redundant ECU and without switching other signals to second communication link 101, e.g., only the vehicle speed is obtained through second communication link 102. Furthermore, if the vehicle speed is not available through either communication link, then steer-by-wire system 110 defaults to a safe tuning map that does not require the vehicle speed input. In another example, if steering wheel position sensor 146 is not able to provide output, the output is received from additional steering wheel position sensor 946. This new output may be used by first steering wheel ECU 113 and communicated to first steering wheel ECU 113 through second steering wheel ECU 114 and steering wheel ICB 115. Other sensors (e.g., steering wheel torque sensor 147 and additional steering wheel torque sensor 947) may have the same redundancy.

Furthermore, multiple ECUs (in each assembly) allow supporting the operation of this assembly, when once ECU becomes unavailable, without impacting any other systems. For example, first steering wheel ECU 113 may become unavailable to support some operations, and steering wheel controller 112 switches to second steering wheel ECU 114. Communication to vehicle network 105 may be still provided using first communication link 101, e.g., through first steering wheel ECU 113 and steering wheel ICB 115. Furthermore, second steering wheel ECU 114 may support components of steering wheel assembly 140 (previously supported using first steering wheel ECU 113), such as steering wheel position sensor 146 and steering wheel torque sensor 147. In other words, steering wheel assembly 140 can maintain additional steering wheel position sensor 946 and additional steering wheel torque sensor 947 in reserve.

In another example, steering wheel assembly 140 may switch from steering wheel position sensor 146 to additional steering wheel position sensor 946 without impacting any other operations, e.g., continue using first steering wheel ECU 113. The connection to additional steering wheel position sensor 946 is provided by second steering wheel ECU 114 and steering wheel ICB 115. The same approach applies to steering wheel torque sensor 147 and additional steering wheel torque sensor 947.

It should be noted that the communication between first steering wheel ECU 113 and second steering wheel ECU 114 may be through steering wheel ICB 115 or, independently, through first communication link 101, vehicle network 105, and second communication link 102. Various examples described above with reference to steering wheel controller 112 are also applicable to steering rack controller 116. For example, sensor communication redundancies apply to rack position sensor 156, rack force sensor 157, additional steering rack position sensor 956, and additional rack force sensor 957 shown in FIG. 9.

Furthermore, various cross-communications are possible between steering wheel ECUs and steering rack ECUs. For example, first steering wheel ECU 113 may communicate with first steering rack ECU 117 using first communication link 101. In another example, first steering wheel ECU 113 may communicate with second steering rack ECU 118 using a combination of first communication link 101, first steering rack ECU 117, and steering rack ICB 119. Other communication options are also within the scope.

Finally, if a component becomes available again, steer-by-wire system 110 allows restoring communication to this component.

System Analytics Examples

In some examples, steer-by-wire system 110 is configured to collect various system performance data. This data may be transmitted for an external analysis (e.g., across a fleet of vehicles, across vehicles of the same model, etc.) or used for internal analysis by vehicle 100. For example, this steer-by-wire system performance data may be used to change various steering and/or torque maps described above (e.g., to limit the occurrence of undesired behavior), to determine various service and maintenance intervals (e.g., premature wear of some components), to study driving habits and system utilization (e.g., parking maneuvers), to update steering systems of an autonomous vehicle, and cost-saving opportunities.

One example of the steer-by-wire system performance data is an alignment log, which may be maintained by steering wheel controller 112. For example, Steering wheel controller 112 records occurrences of a rack position difference exceeding a set threshold (e.g., more than 2 mm). As noted above, a rack position difference is determined based on steering rack position 130 and steering wheel position 120 or, more specifically, is determined as a difference between steering rack position 130 and steering rack position target 138, identified based on steering wheel position 120, e.g., using steering map 170. The occurrences of a rack position difference are recorded, e.g., when steer-by-wire system 110 is operating in the normal mode (based on the status at Steering wheel controller 112, Rack controller 116, and vehicle network 105).

In some examples, multiple instances of a rack position difference are grouped, e.g., over a set period (e.g., 10 seconds), and the highest value of a rack position difference is recorded from this group. Some examples of the data corresponding to a rack position difference include, but are not limited to, the different value and sign, the vehicle speed at the time, steering wheel position 120 at the time, steering wheel rotation speed 143 at the time, steering wheel torque at the time, an estimated force acting on steering rack 151, vehicle mileage at the time, and date-time of the event.

In some examples, steering wheel controller 112 monitors the time duration and mileage between software flashes and also in total for the steering unit. For example, steering wheel controller 112 may monitor the vehicle travel distance (e.g., based on the internal data or data received from vehicle network 105, such as an odometer module). This travel distance may be used to set service intervals and other functions.

In some examples, steering wheel controller 112 monitors the following events: (1) a number of times steering wheel controller 112 has entered a reduced mode (e.g., one or more vehicle systems have been subject temperatures, voltages, and/or other conditions outside of the operating range), (2) a number of times rack controller 116 has entered a reduced mode, (3) a number of times steering wheel controller 112 has triggered the reduced mode, (4) a number of times rack controller 116 has triggered the reduced mode, (5) a number of faults affecting primary system, causing a switch to secondary ECUs, (6) a number of latent faults affecting secondary path, (7) a number of times the catch-up module has been activated (e.g., below a set speed) or, more specifically, a number of times the target and actual rack position was greater than a given threshold, (8) a number of times a curb condition has been detected, (9) a number of times an alignment has been required at power-up due to a misalignment between actual rack position and demanded rack position greater than a threshold (e.g., 10 mm), (10) a number of times the resistive torque has been exceeded, (11) a number of times a belt slip event in rack controller 116 has been detected, (12) a number of times various steering features have been activated, and the like.

CONCLUSION

Although the foregoing concepts have been described in some detail for purposes of clarity of understanding, it will be apparent that some changes and modifications may be practiced within the scope of the appended claims. It should be noted that there are many alternative ways of implementing the processes, systems, and apparatus. Accordingly, the present examples are to be considered illustrative and not restrictive.

What is claimed is:

1. A method of maintaining an alignment between a steering wheel and a steering rack in a steer-by-wire system on a vehicle, the method comprising:
    obtaining, at a steering wheel controller, a steering wheel position from a steering wheel position sensor coupled to the steering wheel;
    obtaining, at the steering wheel controller, a steering rack position from a rack position sensor coupled to the steering rack;
    determining, using the steering wheel controller, a rack position difference based on the steering wheel position and the steering rack position, wherein the rack position difference represents the alignment between the steering wheel and the steering rack; and
    when the rack position difference is greater than a first alignment threshold, thereby requiring adjustment of the alignment between the steering wheel and the steering rack, and when vehicle propulsion is allowed, determining, using the steering wheel controller, at least one of
    a steering wheel position target that is different from the steering wheel position and based on the rack position difference thereby ensuring the alignment between the steering wheel and the steering rack, or
    a steering rack position target that is different from the steering rack position and based on the rack position difference thereby ensuring the alignment between the steering wheel and the steering rack.

2. The method of claim 1, wherein the steering wheel position target is determined when the rack position difference is greater than the first alignment threshold.

3. The method of claim 1, wherein the steering rack position target is determined when the rack position difference is greater than the first alignment threshold.

4. The method of claim 1, wherein both the steering wheel position target and the steering rack position target are determined when the rack position difference is greater than the first alignment threshold.

5. The method of claim 1, further comprising, when the vehicle propulsion is not allowed, determining only the steering wheel position target but not the steering rack position target.

6. The method of claim 1, further comprising, when the vehicle propulsion is not allowed, comparing the rack position difference with a second alignment threshold that is greater than the first alignment threshold.

7. The method of claim 6, further comprising, when the rack position difference is greater than the second alignment threshold:
  sending a system calibration request from the steering wheel controller to a vehicle network, and
  waiting at the steering wheel controller for a response from the vehicle network before determining the at least one of the steering wheel position target or the steering rack position target using the steering wheel controller.

8. The method of claim 1, wherein, when the vehicle propulsion is not allowed, the adjustment of the alignment is performed only by rotating the steering wheel and not by moving the steering rack.

9. The method of claim 1, wherein at least one of the steering wheel position target or the steering rack position target is determined by the steering wheel controller using an alignment map provided at the steering wheel controller.

10. The method of claim 9, wherein the alignment map comprises values of the rack position difference, values of steering wheel position change, and values of steering rack position change.

11. The method of claim 10, further comprising interpolating, by the steering wheel controller, a new set of values of the rack position difference, the steering wheel position change, and the steering rack position change based on existing values in the alignment map.

12. The method of claim 10, wherein a higher value of the rack position difference corresponds to a higher value of the steering wheel position change.

13. The method of claim 10, wherein a higher value of the rack position difference corresponds to a higher value of the steering rack position change.

14. The method of claim 9, wherein the alignment map further comprises values of at least one of vehicle speed, steering angle difference, and propulsion state.

15. The method of claim 14, wherein:
  the alignment map comprises the values of the vehicle speed and the steering angle difference, and
  a higher value of the vehicle speed corresponds to more responsive alignment.

16. The method of claim 1, wherein the steering wheel position and the steering rack position are obtained periodically by the steering wheel controller.

17. The method of claim 1, further comprising determining the steering wheel position target, by the steering wheel controller, from the steering wheel position using a steering map, wherein a difference between the steering wheel position target and the steering rack position is the rack position difference.

18. The method of claim 1, wherein, when the rack position difference is greater than the first alignment threshold and when the vehicle propulsion is allowed, the vehicle is placed by the steering wheel controller into a limp mode.

19. The method of claim 1, further comprising transmitting the steering wheel position target to a steering wheel actuator and rotating the steering wheel using the steering wheel actuator in accordance with the steering wheel position target.

20. The method of claim 1, further comprising transmitting the steering rack position target to a rack actuator and moving the steering rack using the rack actuator in accordance with the steering rack position target.

* * * * *